United States Patent
Ueda et al.

(10) Patent No.: US 7,176,644 B2
(45) Date of Patent: Feb. 13, 2007

(54) MOTOR DRIVING APPARATUS

(75) Inventors: Mitsuo Ueda, Nishinomiya (JP); Hideki Nakata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 144 days.

(21) Appl. No.: 10/834,988

(22) Filed: Apr. 30, 2004

(65) Prior Publication Data

US 2004/0245949 A1    Dec. 9, 2004

(30) Foreign Application Priority Data

Apr. 30, 2003   (JP)   ............................. 2003-125756

(51) Int. Cl.
*H02P 1/00*   (2006.01)
(52) U.S. Cl. .................. 318/138; 318/254; 318/439
(58) Field of Classification Search ............... 318/138, 318/254, 439, 432, 434
See application file for complete search history.

(56) References Cited

U.S. PATENT DOCUMENTS

| | | | | |
|---|---|---|---|---|
| 5,783,917 | A * | 7/1998 | Takekawa | ................... 318/439 |
| 5,982,133 | A | 11/1999 | Murakami et al. | |
| 6,307,336 | B1 * | 10/2001 | Goff et al. | ................... 318/254 |
| 6,462,492 | B1 * | 10/2002 | Sakamoto et al. | .......... 318/254 |
| 6,486,627 | B1 * | 11/2002 | Gabrys | ....................... 318/161 |
| 6,590,360 | B2 * | 7/2003 | Hirata et al. | ................. 318/727 |
| 6,812,667 | B2 * | 11/2004 | Yasohara et al. | ........... 318/599 |

2002/0149342 A1   10/2002 Nakata et al.

FOREIGN PATENT DOCUMENTS

| | | |
|---|---|---|
| EP | 1 237 274 | 9/2002 |
| JP | 2000-341991 | 12/2000 |
| JP | 3146791 | 1/2001 |
| JP | 2003-088157 | 3/2003 |

(Continued)

OTHER PUBLICATIONS

K. Hatanaka et al., No. 74, Rpm Control System Using Weak Magnetic Flux Control of PM Motor, "Variable Speed Drive System of Permanent Magnet Synchronous Motors with Flux-weakening Control", International Symposium of Industry Applications Society of the Institute of Electrical Engineers of Japan, pp. 310-315.

(Continued)

*Primary Examiner*—Rina Duda
(74) *Attorney, Agent, or Firm*—Wenderoth, Lind & Ponack, L.L.P.

(57) ABSTRACT

A motor driving apparatus includes an inverter circuit for converting an output voltage of a power supply into a three-phase AC and outputting the same to the brushless motor, a rotor position estimation unit for estimating a rotor position of the brushless motor, and an inverter control unit for controlling the inverter circuit so that the brushless motor is driven by a current based on the estimated rotor position. The inverter control unit determines an advance angle of the current supplied to the brushless motor with respect to the estimated rotor position so as to minimize a deviation between a command rpm and an actual rpm. Therefore, it is possible to perform stable weak field control for the brushless motor, independently from the input voltage of the inverter circuit, without using predetermined control variables such as table values.

17 Claims, 17 Drawing Sheets

FOREIGN PATENT DOCUMENTS

KR  2003-0022023  3/2003

OTHER PUBLICATIONS

Patent Abstracts of Japan, vol. 1995, No. 06, Jul. 31, 1995 & JP 07 087783 A, (Fujitsu General Ltd), Mar. 31, 1995.

Patent Abstracts of Japan, vol. 017, No. 085, Feb. 19, 1993 & JP 04 281387 A, Oct. 6, 1992 *abstract*.

Patent Abstracts of Japan, vol. 2002, No. 06, Jun. 4, 2002 & JP 2002 045591, Feb. 12, 2002 *abstract*.

* cited by examiner

Control of advance angle $\beta$ is not carried out.

Control of advance angle $\beta$ is carried out.

MOTOR DRIVING APPARATUS

FIELD OF THE INVENTION

The present invention relates to a motor driving apparatus and, more particularly, to a motor driving apparatus for driving and controlling a brushless motor by an inverter circuit.

BACKGROUND OF THE INVENTION

A brushless motor generates an inverse electromotive force ωE (E: a magnetomotive force (main magnetic flux) of a permanent magnet used as a field magnet, ω: an axial angular velocity of the motor) when it is driven. Accordingly, an equivalent circuit for one phase of the brushless motor can be represented as shown in FIG. 11(a).

In FIG. 11(a), R is a per-phase primary resistance of the brushless motor, L is a per-phase inductance of the brushless motor, I is a primary current (phase current) of the brushless motor, and V is a terminal voltage applied to the brushless motor.

When driving the brushless motor by an inverter circuit, a value obtained by multiplying an input voltage of the inverter circuit by a voltage conversion ratio (output voltage/input voltage <1) of the inverter circuit is the terminal voltage V of the motor.

Further, when the terminal voltage V of the brushless motor is subjected to vector decomposition and expressed using a d axis voltage Vd and a q axis voltage Vq, the terminal voltage V is represented by following formulae (1) and (2).

$$\begin{bmatrix} Vd \\ Vq \end{bmatrix} = \begin{bmatrix} R & -\omega \cdot Lq \\ \omega \cdot Ld & R \end{bmatrix} \begin{bmatrix} Id \\ Iq \end{bmatrix} + \begin{bmatrix} 0 \\ \omega \cdot E \end{bmatrix} \quad (1)$$

$$V = \sqrt{Vd^2 + Vq^2} \quad (2)$$

Further, FIG. 11(b) is a vector diagram which is drawn on the basis of formula (1) considering that the primary resistance R is sufficiently small.

In FIG. 11(b), Ld is a d axis inductance, Lq is a q axis inductance, Id is a d axis current (field current), and Iq is a q axis current (torque current). The field current Id and the torque current Iq are represented by formulae (3a) and (3b) as follows.

$$Id = Ip \cdot \sin \beta \quad (3a)$$

$$Iq = Ip \cdot \cos \beta \quad (3b)$$

wherein β is an angle of advance (advance angle) in the phase of the current that flows into the motor (motor current) with respect to the rotor position of the brushless motor, and Ip is the amplitude of the motor current I.

The above-mentioned formulae (1) and (2) indicate that vector control for the brushless motor, i.e., motor control using the field current Id and the torque current Iq, is possible. More specifically, the above-mentioned vector control is to vary a command value of the torque current Iq on the basis of an output torque that is required of the brushless motor, while controlling a command value of the field current Id so as to be a constant value (for example, 0). By controlling the inverter circuit for driving the brushless motor on the basis of these command values, an output torque T represented by formula (4) can be obtained.

$$T = E \cdot Iq + (Ld - Lq) \cdot Id \cdot Iq \quad (4)$$

The first term of formula (4) indicates a torque component generated by a permanent magnet as a field magnet, i.e., a magnet torque, and the second term indicates a reluctance torque caused by saliency of the brushless motor. Accordingly, when the brushless motor is a non-salient pole motor, Ld=Lq holds, and only the first term remains in formula (4). When the brushless motor is a salient pole motor, Ld≠Lq holds, and the second term of formula (4) has a value.

Further, the terminal voltage V of the motor is represented by formula (5) as follows.

$$V = \omega \cdot E + j \cdot \omega Lq \cdot Iq + j \cdot \omega \cdot Ld \cdot Id \quad (5)$$

As can be seen from formula (5), as the rpm of the brushless motor, i.e., the axial angular velocity ω of the brushless motor, increases, the counter-electromotive voltage ωE increases in proportion to the axial angular velocity ω. Accordingly, if the increase in the counter-electromotive voltage ωE is allowed as it is, the terminal voltage V of the brushless motor becomes higher than the input voltage of the inverter circuit due to the increase in the counter-electromotive voltage ωE, resulting in a problem that the brushless motor cannot be driven at the higher rpm.

As a solution of the above-mentioned problem, there is a method called "weak field control" (for example, refer to Japanese Patent No. 3146791 (FIGS. 1 and 10)).

In this method, the motor terminal voltage V in the high rpm area can be reduced to no more than the input voltage of the inverter circuit, by supplying a field current Id and performing control for generating a field magnetomotive force that weakens the field magnetomotive force of the permanent magnet. The field current Id having such characteristics is called a weak field current. The weak field current Id is predetermined from the motor rpm N and the torque T. To be specific, the correspondences between the values of motor rpm N and torque T, and the values of weak field current Id suited thereto are defined on a table (map) or the like. Under the actual control of the field current Id, the weak field current Id is set at a value suited to the corresponding torque T and rpm N, using the above-mentioned table (for example, refer to "No. 74, Rpm Control System using Weak Magnetic Flux Control of PM Motor", International Symposium of Industry Applications Society of the Institute of Electrical Engineers of Japan).

However, when controlling the weak field current Id using the table values as described above, the weak field current Id becomes excessively large or small with variations in the input voltage of the inverter circuit. As a result, the motor driving efficiency is reduced, or the required torque is not satisfied and thereby the maximum rpm cannot be realized.

For example, when the inverter input voltage is high, a weak field current Id larger than required is supplied. As is evident from the vector diagram shown in FIG. 11(b) and formula (5), although the terminal voltage is lowered when the weak field current Id flows, a current Id that does not contribute to occurrence of torque is generated, leading to a reduction in efficiency.

Conversely, when the inverter input voltage is low, a weak field current Id that is sufficient to reduce the motor terminal voltage V to no more than the inverter input voltage cannot be supplied, and further, a torque current Iq that is sufficient to obtain a required torque cannot be supplied.

In order to solve the above-mentioned problems, there has been proposed a method including detecting an inverter input voltage, and calculating a weak field current on the basis of the detected voltage and a torque required of a motor (for example, refer to Japanese Patent No. 3146791 (FIGS. 1 and 10).

Further, as a method for determining a weak field current Id, there has been proposed a method including detecting that an inverter output voltage becomes equal to or larger than an inverter input voltage, and controlling a weak field current Id so as to resolve such state where the inverter output voltage is high (for example, refer to Japanese Published Patent Application No. 2000-341991 (FIG. 1)).

However, in the conventional motor driving apparatus that controls the weak field current of the motor according to the input voltage of the inverter circuit, when the input voltage of the inverter circuit varies steeply or periodically, the command value of the weak field current varies according to variations in the input voltage. In other words, there is a fear of extremely unstable behavior of the motor depending on the shapes of variations in the input voltage.

Further, since the conventional motor driving apparatus has a circuit for detecting the inverter input voltage, detection accuracy and responsivity in this circuit may adversely affect determination of a weak field current that is a control variable in weak field control.

SUMMARY OF THE INVENTION

The present invention is made to solve the above-described problems and has for its object to provide a motor driving apparatus that can perform weak field control for a brushless motor with high stability, without using predetermined control variables such as table values, even when an output voltage from a power supply varies steeply or periodically, thereby increasing the maximum rpm of the brushless motor.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a motor driving apparatus for driving a brushless motor comprises an inverter circuit for converting an output voltage of a power supply into a driving voltage, and outputting the driving voltage to the brushless motor; a rotor position estimation unit for estimating a rotor position of the brushless motor; an inverter control unit for controlling the inverter circuit so that the brushless motor is driven by a current based on the estimated rotor position; and the inverter control unit controls the rpm of the brushless motor by changing a phase difference between the estimated rotor position and the current supplied to the brushless motor. Therefore, it is possible to perform appropriate weak field control that is not affected by variations in the input voltage of the inverter circuit, without using control variables such as predetermined table values.

To be specific, since complicated processing, such as detecting an input voltage of the inverter and calculating a weak field control variable from the input voltage, is not carried out, weak field control is carried out with a very simple circuit construction. Further, since no error occurs in detecting the inverter input voltage or in calculating the weak field control variables, stable weak field control is carried out even when the inverter input voltage varies excessively.

As a result, stable driving control for a brushless motor is realized with a simple circuit construction.

According to a second aspect of the present invention, in the motor driving apparatus according to the first aspect, the inverter control unit controls the rpm of the brushless motor by increasing/decreasing the phase difference, under the state where the amplitude of the current supplied to the brushless motor is fixed at a maximum value. Therefore, rpm control is carried out under the state where variations in the current that flows in the brushless motor are suppressed, resulting in further stable weak field control.

According to a third aspect of the present invention, in the motor driving apparatus according to the second aspect, the maximum amplitude of the current supplied to the brushless motor is a maximum current value that is allowed to be supplied to the brushless motor. Therefore, even when weak field control is carried out, a current that is not allowed by the brushless motor, i.e., a current that demagnetizes the brushless motor, does not flow, resulting in a stable driving apparatus.

Further, since the rpm is controlled by adjusting the phase difference under the state where the current amplitude is maintained at the maximum current value that is allowed to be supplied to the brushless motor, the required rpm is achieved by the smallest weak field current. As a result, the brushless motor is driven with the current advance angle of the highest efficiency.

According to a fourth aspect of the present invention, in the motor driving apparatus according to the first aspect, the inverter control unit comprises a command current waveform generation unit for generating a waveform of a command current on the basis of the estimated rotor position; and a pulse generation unit for generating a pulse signal as a control signal for the inverter circuit so as to decrease a deviation between the waveform of the command current generated by the command current waveform generation unit and the waveform of the current that actually flows in the brushless motor; and the inverter control unit controls the rpm of the brushless motor by increasing/decreasing the phase difference under a state where the amplitude of the waveform of the command current is fixed at a maximum value. Therefore, rpm control is carried out under the state where variations in the current that flows in the brushless motor are suppressed, resulting in more stable weak field control.

According to a fifth aspect of the present invention, in the motor driving apparatus according to the fourth aspect, the maximum amplitude of the waveform of the command current is a maximum current value that is allowed to be supplied to the brushless motor. Therefore, even when weak field control is carried out, a current that is not allowed by the brushless motor, i.e., a current that demagnetizes the brushless motor, does not flow, resulting in a stable driving apparatus.

Further, since the rpm is controlled by adjusting the phase difference under the state where the current amplitude is maintained at the maximum current value that is allowed to be supplied to the brushless motor, the required rpm is achieved by the smallest weak field current. As a result, the brushless motor is driven with the current advance angle of the highest efficiency.

According to a sixth aspect of the present invention, in the motor driving apparatus according to the first aspect, the inverter control unit comprises a current amplitude determination unit for determining an amplitude of the current to be supplied to the brushless motor; a command current waveform generation unit for generating a waveform of a command current on the basis of the current amplitude determined by the current amplitude determination unit; and a pulse generation unit for generating a pulse signal as a control signal for the inverter circuit so as to decrease a deviation between the waveform of the command current generated by the command current waveform generation unit and the waveform of the current that actually flows in the brushless motor; and the inverter control unit obtains a phase difference that maximizes the rpm of the brushless motor, by changing the phase difference between the estimated rotor position and the current supplied to the brushless motor, under a state where the amplitude of the command current is constant. Therefore, it is possible to set the current advance angle that an advance angle of the current supplied to the brushless motor with respect to the estimated rotor position, to an optimum value by a simple circuit construction for only varying the phase difference. Since the optimum current advance angle is a value that allows maximum utilization of the reluctance torque of the brushless motor, the brushless motor is driven with the minimum current value that satisfies the required torque, thereby maximizing the motor driving efficiency.

Furthermore, since the phase difference at which the rpm of the brushless motor becomes maximum is obtained by varying the phase difference between the estimated rotor position and the current supplied to the brushless motor, even when an error occurs between the estimated rotor position and the actual rotor position due to variations in the various constants that constitute the brushless motor, the current advance angle becomes a value that absorbs the error. Therefore, it is possible to achieve the maximum efficiency of the brushless motor and, moreover, to avoid a phenomenon in which an error occurs in the estimated rotor position and thereby the brushless motor loses synchronization, resulting in stable motor driving.

According to a seventh aspect of the present invention, in the motor driving apparatus according to the first aspect, the inverter control unit comprises a rpm determination unit for determining a rpm of the brushless motor; a current amplitude determination unit for determining an amplitude of the current to be supplied to the brushless motor so as to decrease a deviation between the rpm determined by the rpm determination unit and an actual rpm; a command current waveform generation unit for generating a waveform of a command current on the basis of the current amplitude; and a pulse generation unit for generating a pulse signal as a control signal for the inverter circuit so that a deviation between the waveform of the command current generated by the command current waveform generation unit and the waveform of the current that actually flows in the brushless motor becomes zero; and the inverter control unit obtains a phase difference that minimizes the amplitude of the command current, by changing the phase difference between the estimated rotor position and the current supplied to the brushless motor, under a state where the command rpm of the brushless motor is constant. Therefore, it is possible to set the current advance angle that an advance angle of the current supplied to the brushless motor with respect to the estimated rotor position, to an optimum value by a simple circuit construction for only varying the phase difference. Since the optimum current advance angle is a value that allows maximum utilization of the reluctance torque of the brushless motor, the brushless motor is driven with the minimum current value that satisfies the required torque, thereby maximizing the motor driving efficiency.

Furthermore, since the phase difference at which the rpm of the brushless motor becomes maximum is obtained by varying the phase difference between the estimated rotor position and the current supplied to the brushless motor, even when an error occurs between the estimated rotor position and the actual rotor position due to variations in the various constants that constitute the brushless motor, the current advance angle becomes a value that absorbs the error. Therefore, it is possible to achieve the maximum efficiency of the brushless motor and, moreover, to avoid a phenomenon in which an error occurs in the estimated rotor position and thereby the brushless motor loses synchronization, resulting in stable motor driving.

According to an eighth aspect of the present invention, in the motor driving apparatus according to the first aspect, the inverter circuit includes a capacitor for charging a regenerative current from the brushless motor. Therefore, it is possible to suppress an increase in the inverter input voltage, which occurs when the motor is stopped or the switching operation of the inverter circuit is stopped, thereby avoiding destruction of components and the like.

According to a ninth aspect of the present invention, in the motor driving apparatus according to the first aspect, the inverter circuit has an inductor that is connected between the inverter circuit and the power supply, and cuts off noise generated in the inverter circuit. Therefore, it is possible to reduce switching noise that occurs at the input side of the inverter, thereby increasing the power factor of the input current to improve the current waveform.

According to a tenth aspect of the present invention, there is provided a compressor including a brushless motor for generating power, and a motor driving apparatus for driving the brushless motor, the motor driving apparatus being the motor driving apparatus according to the first aspect. Therefore, it is possible to drive the brushless motor with stability until reaching a high rpm, by performing simple and stable weak field control for varying only the current advance angle, even under the condition where the input voltage of the inverter varies. Thereby, a compressor equipped with a brushless motor and a driving apparatus thereof is provided at a reduced cost and with a high degree of freedom in design.

According to an eleventh aspect of the present invention, there is provided an air conditioner including a compressor having a brushless motor for generating power, and a motor driving apparatus for driving the brushless motor of the compressor, the motor driving apparatus being the motor driving apparatus according to the first aspect. Therefore, it is possible to drive the brushless motor with stability until reaching a high rpm, by performing simple and stable weak field control for varying only the current advance angle, even under the condition where the input voltage of the inverter varies. Thereby, an air conditioner equipped with a brushless motor and a driving apparatus thereof is provided at a reduced cost and with a high degree of freedom in design.

According to a twelfth aspect of the present invention, there is provided a refrigerator including a compressor having a brushless motor for generating power, and a motor driving apparatus for driving the brushless motor of the compressor, the motor driving apparatus being the motor driving apparatus according to the first aspect. Therefore, it is possible to drive the brushless motor with stability until reaching a high rpm, by performing simple and stable weak field control for varying only the current advance angle, even under the condition where the input voltage of the inverter varies. Thereby, a refrigerator equipped with a brushless motor and a driving apparatus thereof is provided at a reduced cost and with a high degree of freedom in design.

According to a thirteenth aspect of the present invention, there is provided an electric washing machine including a brushless motor for generating power, and a motor driving apparatus for driving the brushless motor, the motor driving apparatus being the motor driving apparatus according to the first aspect. Therefore, it is possible to drive the brushless motor with stability until reaching a high-rpm, by performing simple and stable weak field control for varying only the current advance angle, even under the condition where the input voltage of the inverter varies. Thereby, a washing machine equipped with a brushless motor and a driving apparatus thereof is provided at a reduced cost and with a high degree of freedom in design.

According to a fourteenth aspect of the present invention, there is provided an air blower including a brushless motor for generating power, and a motor driving apparatus for driving the brushless motor, the motor driving apparatus being the motor driving apparatus according to the first aspect. Therefore, it is possible to drive the brushless motor with stability until reaching a high-rpm, by performing simple and stable weak field control for varying only the current advance angle, even under the condition where the input voltage of the inverter varies. Thereby, an air blower equipped with a brushless motor and a driving apparatus thereof is provided at a reduced cost and with a high degree of freedom in design.

According to a fifteenth aspect of the present invention, there is provided an electric vacuum cleaner including a brushless motor for generating power, and a motor driving apparatus for driving the brushless motor, the motor driving apparatus being the motor driving apparatus according to the first aspect. Therefore, it is possible to drive the brushless motor with stability until reaching a high-rpm, by performing simple and stable weak field control for varying only the current advance angle, even under the condition where the input voltage of the inverter varies. Thereby, a vacuum cleaner equipped with a brushless motor and a driving apparatus thereof is provided at a reduced cost and with a high degree of freedom in design.

According to a sixteenth aspect of the present invention, there is provided an electric dryer including a compressor having a brushless motor for generating power, and a motor driving apparatus for driving the brushless motor of the compressor, the motor driving apparatus being the motor driving apparatus according to the first aspect. Therefore, it is possible to drive the brushless motor with stability until reaching a high-rpm, by performing simple and stable weak field control for varying only the current advance angle, even under the condition where the input voltage of the inverter varies. Thereby, a dryer equipped with a brushless motor and a driving apparatus thereof is provided at a reduced cost and with a high degree of freedom in design.

According to a seventeenth aspect of the present invention, there is provided a heat pump type hot-water supply unit including a compressor having a brushless motor for generating power, and a motor driving apparatus for driving the brushless motor of the compressor, the motor driving apparatus being a motor driving apparatus according to the first aspect. Therefore, it is possible to drive the brushless motor with stability until reaching a high-rpm, by performing simple and stable weak field control for varying only the current advance angle, even under the condition where the input voltage of the inverter varies. Thereby, a hot-water supply unit equipped with a brushless motor and a driving apparatus thereof is provided at a reduced cost and with a high degree of freedom in design.

According to an eighteenth aspect of the present invention, there is provided a hybrid car including a brushless motor for generating power, and a motor driving apparatus for driving the brushless motor, the motor driving apparatus being the motor driving apparatus according to the first aspect. Therefore, it is possible to drive the brushless motor with stability until reaching a high-rpm, by performing simple and stable weak field control for varying only the current advance angle, even under the condition where the input voltage of the inverter varies. Thereby, a hybrid car equipped with a brushless motor and a driving apparatus thereof is provided at a reduced cost and with a high degree of freedom in design.

BRIEF DESCRIPTION OF THE DRAWINGS

FIG. 4($b$) is a waveform diagram for explaining the operation of the motor driving apparatus according to the second embodiment, and illustrating a waveform of an output current in the case where control of an advance angle is not carried out.

FIG. 4($c$) is a waveform diagram for explaining the operation of the motor driving apparatus according to the second embodiment, and illustrating a waveform of an output current in the case where control of an advance angle is carried out.

DETAILED DESCRIPTION OF THE PREFERRED EMBODIMENTS

Embodiment 1

Figure 1:
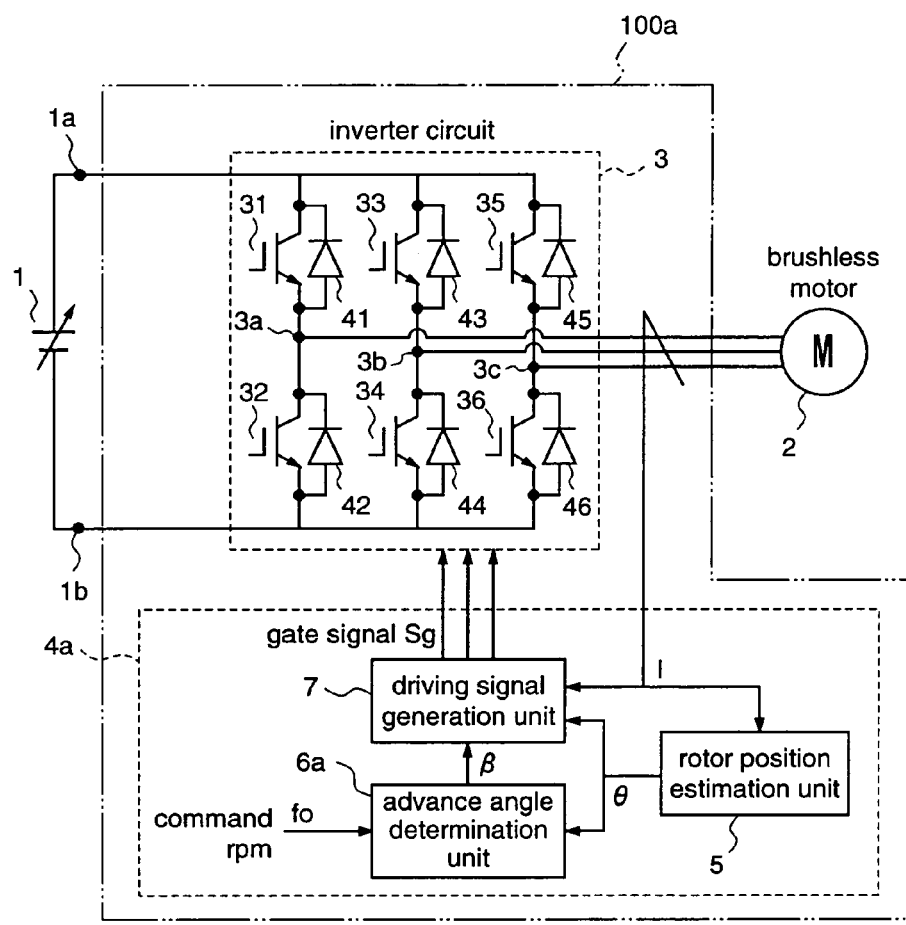
FIG. 1 is a block diagram for explaining a motor driving apparatus according to a first embodiment of the present invention.

FIG. 1 is a block diagram for explaining a motor driving apparatus according to a first embodiment of the present invention.

A motor driving apparatus 100a according to the first embodiment has an input terminal connected to a power supply 1, and drives a brushless motor 2 at a required arbitrary rpm. The motor driving apparatus 100a performs weak field control for the brushless motor 2 by varying an advance angle β of a phase of a motor current with respect to a rotor position of the motor.

In this first embodiment, the advance angle β of the motor current is controlled so that a deviation between the command rpm to the motor and the actual rpm becomes zero. While in the prior art the control target in the weak field control is the weak field current Id, the advance angle β of the motor current according to the first embodiment and the weak field current Id according to the prior art are similar control targets in the weak field control.

Hereinafter, an inverter circuit 3 and an inverter control unit 4a which are constituents of the motor driving apparatus 100a will be described in detail.

The inverter circuit 3 converts an output voltage of the power supply 1 into a three-phase AC on the basis of a drive signal Sg outputted from the inverter control unit 4a, and supplies the three-phase AC to the brushless motor 2.

The inverter circuit 3 has first and second switching elements 31 and 32 connected in series, third and fourth switching elements 33 and 34 connected in series, and fifth and sixth switching elements 35 and 36 connected in series. One end (higher-potential-side terminals) of each of the first, third, and fifth switching elements 31, 33, and 35 are connected to each other, and the connection node (one input node) is connected to an output node 1a of the power supply 1. One end (lower-potential-side terminals) of each of the second, fourth, and sixth switching elements 32, 34, and 36 are connected to each other, and the connection node (the other input node) is connected to an output node 1b of the power supply 1. Further, first to sixth diodes 41 to 46 are connected in inverse parallel to the first to sixth switching elements 31 to 36, respectively. A connection node 3a of the first and second switching elements 31 and 32 is a first output node of the inverter circuit 3, a connection node 3b of the third and fourth switching elements 33 and 34 is a second output node of the inverter circuit 3, and a connection node 3c of the fifth and sixth switching elements 35 and 36 is an output node of the inverter circuit 3. The first to third output nodes 3a to 3c of the inverter circuit 3 are the respective input nodes of the three-phase input of the motor 2.

While in this first embodiment the inverter circuit 3 is of a three-phase full bridge structure, the inverter circuit 3 may be of any circuit structure so long as it can output a three-phase AC. For example, the inverter circuit 3 may be constructed using a capacitor for a portion corresponding to one phase of the three-phase AC output. Further, the inverter circuit 3 may include snubber circuits added to the respective switching elements.

Further, the power supply 1 has a variable output level. The power supply 1 may rectify an output voltage of an AC power supply (not shown) using a rectifier circuit and output the obtained voltage as it is, or it may be provided with a small-capacitance capacitor at the output end to smooth the output voltage. Alternatively, it may be a battery having a small capacity.

That is, the power supply 1 is not restricted to one that constantly outputs a DC voltage of a specified level. The power supply 1 may momentarily vary the level of the output voltage. For example, it may lower the level of the output voltage to about half the specified level or to the zero level.

The inverter control unit 4a supplies the inverter circuit 3 with a drive signal (gate signal Sg) so that the brushless motor 2 is driven at an rpm desired by the user. The inverter control unit 4a comprises a rotor position estimation unit 5, an advance angle determination unit 6a, and a drive signal generation unit 7.

The rotor position estimation unit 5 estimates a rotor position from a current (motor current) I that is actually supplied from the inverter circuit 3 to the brushless motor 2. However, the method of estimating the rotor position is not restricted thereto. That is, estimation of the rotor position may be carried out by utilizing an induced voltage of the brushless motor 2, or it may be carried out on the basis of an output from a position sensor that is fixed to the brushless motor 2.

The advance angle determination unit 6a determines an advance angle β of a current to be supplied to the brushless motor 2, on the basis of a command rpm fo indicated by a command signal from the outside, which is generated by user operation or the like, and an actual rpm f of the brushless motor 2, which is obtained by differentiating the rotor position θ estimated by the rotor position estimation unit 5. That is, the advance angle determination unit 6a determines the advance angle β so that a deviation between the command rpm fo and the actual rpm f becomes zero. Specific methods for determining the advance angle β in this way include the hill-climbing method, PI (proportional integration) control, and the like.

The drive signal generation unit 7 receives the current (motor current) I outputted from the inverter circuit 3 to the brushless motor 2, the estimated phase (estimated position) θ of the rotor obtained by the rotor position estimation unit 5, and the advance angle β obtained by the advance angle determination unit 6a, and outputs a drive signal Sg to the inverter circuit 3 so that the phase of the motor current I advances by the advance angle β from the estimated rotor phase θ.

Next, the operation will be described.

In the inverter circuit 3 having an input terminal connected to the power supply 1, the respective switching elements 31 to 36 are turned on/off according to the drive signal Sg from the inverter control unit 4a, and the output voltage of the power supply 1 is converted into a three-phase AC to be output to the motor 2, whereby the motor 2 is driven.

At this time, the inverter control unit 4a generates a pulse signal as a drive signal Sg to be applied to the gates of the switching elements 31 to 36, on the basis of the command rpm fo indicated by the command signal from the outside, and the current (motor current) I supplied to the motor 2.

Hereinafter, the operations of the respective components 5, 6a, and 7 of the inverter control unit 4a will be described.

The rotor position estimation unit 5 estimates the rotor position (rotor phase) from the current (motor current) I supplied from the inverter circuit 3 to the brushless motor 2.

The advance angle determination unit 6a determines the advance angle β of the motor current supplied to the brushless motor 2, on the basis of the command rpm fo indicated by the command signal from the outside, and the actual rpm f of the brushless motor 2 obtained by differentiating the estimated rotor phase θ from the rotor position estimation unit 5.

The drive signal generation unit 7 generates a drive signal Sg to be output to the inverter circuit 3, on the basis of the current (motor current) I that is actually outputted from the inverter circuit 3 to the brushless motor 2, the estimated rotor phase θ obtained by the rotor position estimation unit 5, and the advance angle β determined by the advance angle determination unit 6a. Then, in the inverter circuit 3, the respective switching elements are turned on/off by the drive signal Sg, and the current I that is controlled so as to advance by the advance angle β from the estimated rotor phase θ is output to the motor 2.

Hereinafter, an example of a method for determining the advance angle β using the hill-climbing method will be described with reference to a flowchart shown in FIG. 2.

When there is a deviation between the command rpm fo and the actual rpm f, the advance angle determination unit 6a starts a process for determining the advance angle β.

Initially, in step S1, the absolute value (|fo−f|) of the deviation between the command rpm fo and the actual rpm f is calculated.

Next, in step S2, it is determined as to which of a process of increasing the advance angle β (step S3) and a process of decreasing the advance angle β (step S4) should be carried out, on the basis of a β increment flag. That is, the process of step S3 is carried out when the value of the β increment flag is [−1] while the process of step S4 is carried out when the value of the increment flag is [1]. In the process of step S2, the value of the β increment flag is either [1] or [−1] that is previously set as an initial value.

In step S3, a process of decreasing (delaying) the advance angle β that is currently outputted is carried out. The amount of decrease in the advance angle β in step S3 may be a predetermined constant value, or it may be determined on the basis of a deviation between the command rpm fo and the actual rpm f (rpm deviation) or a difference between the previously calculated rpm deviation and the presently calculated rpm deviation. By determining the amount of decrease in the advance angle β in step S3 on the basis of the rpm deviation as described above, the velocity of hill-climbing (i.e., the velocity of the process for determining the advance angle by the hill-climbing method) increases, whereby the advance angle β at which the rpm deviation becomes zero can be determined with high responsivity.

In step S4, a process of increasing (advancing) the advance angle β that is currently outputted is carried out. The amount of increase in the advance angle β in step S4 may be a predetermined constant value, or it may be determined on the basis of a deviation between the command rpm fo and the actual rpm f (rpm deviation) or a difference between the previously calculated rpm deviation and the presently calculated rpm deviation. When the amount of increase in the advance angle β in step S4 is determined on the basis of the rpm deviation as described above, the velocity of hill-climbing increases, whereby the advance angle β at which the rpm deviation becomes zero can be determined with high responsivity.

In step S5, the absolute value of a deviation between the command rpm fo and the actual rpm f is again calculated under the state where the advance angle β of the motor current is updated to the advance angle β determined in step S3 or S4.

In step S6, a difference between the absolute value of the previous rpm deviation that is obtained before the updation of the advance angle β to the advance angle β determined in step S3 or S4, and the absolute value of the rpm deviation obtained after the updation of the advance angle β, is calculated. When the value (the absolute value of the rpm deviation) after the updation of the advance angle β is larger than the value before the updation of the advance angle β, a process of step S7 is carried out. When the value after the updation of the advance angle β is equal to or smaller than the value before the updation of the advance angle β, a process of step S8 is carried out.

In step S7, since the direction in which the advance angle β should be change is incorrect, a process of inverting the sign of the β increment flag is carried out, followed by step S8.

In step S8, a deviation between the command rpm and the actual rpm f (rpm deviation) is calculated, and the advance angle determination process (the process in the flow chart of FIG. 2) by the advance angle determination unit 6a is completed when the rpm deviation is zero or within an allowable range, while the process of step S2 is carried out again when the rpm deviation is out of the allowable range.

Even when the inverter input voltage is too low to increase the motor rpm up to the command rpm fo and thereby the deviation between the command rpm fo and the actual rpm f cannot be brought to zero, the above-mentioned control using the hill-climbing method enables the advance angle β of the motor current to converge to a value at which the torque is generated at maximum, resulting in stable high-speed rotation of the motor.

Figure 2:
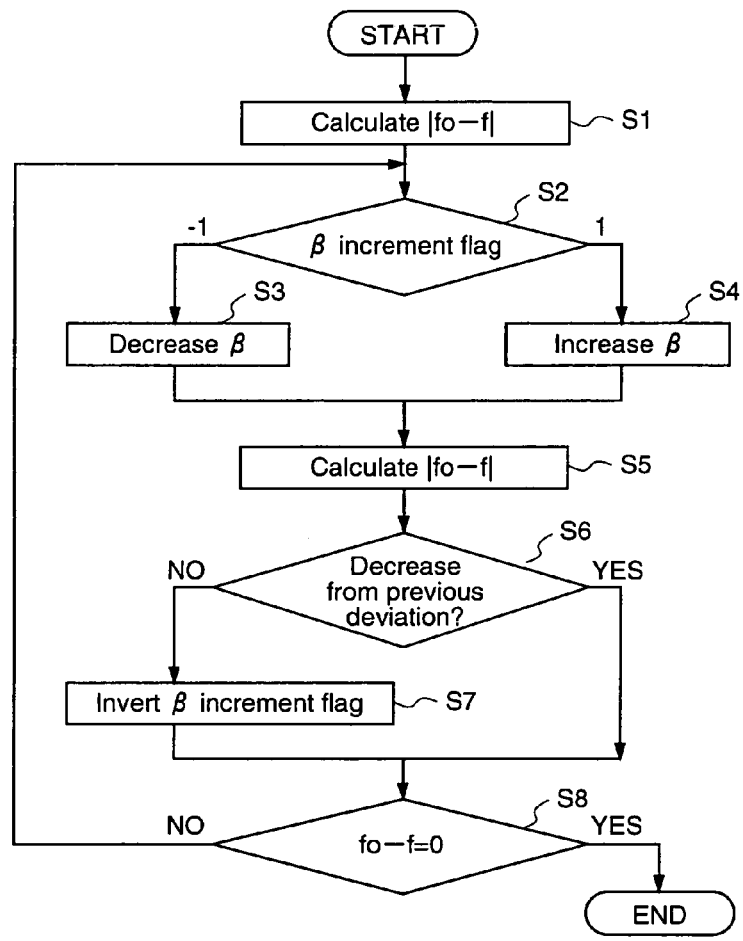
FIG. 2 is a flowchart for explaining the operation of an advance angle determination unit included in the motor driving apparatus according to the first embodiment, and illustrating a process flow of a hill-climbing method as an example of an advance angle determination method.

The flow of the advance angle determination process shown in FIG. 2 is merely an example, and the process of step S8 in the flow may be carried out between the process of step S5 and the process of step S6. Also in this case, the same effects as described above can be achieved. Thus, the flow of the process of determining the advance angle varies in many ways.

Alternatively, PI (proportional integration) control for determining an advance angle β so that a deviation between the command rpm fo and the actual rpm f becomes zero may be employed instead of the hill-climbing method. In this case, however, a limiter value must be provided because there is a possibility of divergence of the advance angle β.

As described above, the motor driving apparatus according to the first embodiment is provided with the inverter circuit 3 for converting the output voltage of the power supply 1 into a three-phase AC and outputting the three-phase AC to the motor 2, and the inverter control unit 4a for controlling the advance angle β of the current (motor current) supplied from the inverter circuit 3 to the motor 2. The inverter control unit 4a determines the advance angle β of the motor current so that a deviation between the command rpm fo and the actual rpm f is minimized, whereby weak field control for the brushless motor is carried out with stability, without using predetermined control variables such as table values.

To be specific, in the motor current advance angle control according to the first embodiment, there occurs no error in detecting or calculating the input voltage of the inverter circuit, whereby stable weak field control can be carried out even when variations in the inverter input voltage are significant and steep or periodical.

Further, in this first embodiment, no complicated arithmetic processing is performed, such as detecting the input voltage of the inverter circuit 3 and then calculating the advance angle β from the detected value, whereby the circuit structure of the motor driving apparatus is simplified.

While in this first embodiment the drive signal generation unit 7 does not restrict the amplitude value of the motor current, the drive signal generation unit 7 may generate a drive signal Sg of the inverter circuit 3 so that the maximum amplitude value of the current supplied to the brushless motor 2 is kept at a constant value. In this case, in the advance angle determination unit 6a, excessive increase or decrease in the advance angle β of the motor current, which is determined on the basis of the actual rpm of the motor, is suppressed, resulting in more stable weak field control. Furthermore, when the maximum amplitude of the motor current maintained at the constant value is set at a maximum current value that is allowed by the brushless motor 2, a current that is not allowed by the brushless motor, i.e., a current that causes deterioration of the brushless motor due to demagnetization, does not flow even when weak field control is carried out, thereby providing a safe motor driving apparatus.

Further, in this first embodiment, the advance angle determination unit 6a determines the advance angle of the motor current so that a deviation between the command rpm fo and the actual rpm f is minimized, regardless of the value of the current supplied to the brushless motor 2. However, the advance angle determination unit 6a may output an optimum advance angle (an advance angle that utilizes the reluctance torque at maximum) or a constant advance angle, when the current supplied to the brushless motor 2 is equal to or smaller than the allowable current. In this case, the rpm of the brushless motor 2 is controlled by the amplitude of the current supplied to the motor 2.

In the above-mentioned construction, during low-rpm rotation in which driving at the command rpm is possible without performing weak field control, the advance angle of the motor current can be the optimum advance angle. On the other hand, during high-rpm rotation in which weak field control is required, the advance angle of the motor current can be the minimum advance angle that realizes the command rpm. Therefore, the brushless motor 2 can be driven with the advance angle that satisfies the maximum efficiency of the motor 2, over the whole rpm area.

Embodiment 2

Figure 3:
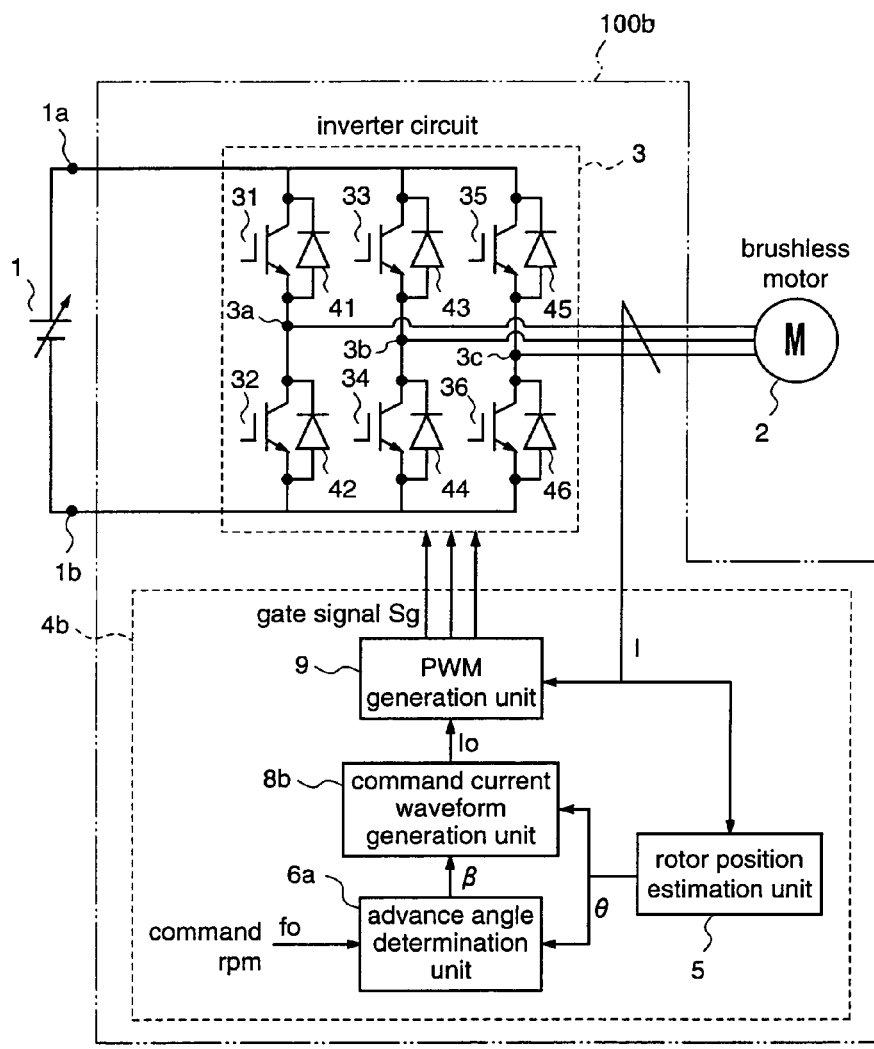
FIG. 3 is a block diagram for explaining a motor driving apparatus according to a second embodiment of the present invention.

FIG. 3 is a block diagram for explaining a motor driving apparatus according to a second embodiment of the present invention.

A motor driving apparatus 100b according to the second embodiment has an input terminal connected to a power supply 1, drives a brushless motor 2 at an arbitrary rpm, and performs weak field control for the brushless motor 2 by adjusting an advance angle β of a motor current, like the motor driving apparatus 100a according to the first embodiment. In this second embodiment, control of the advance angle β of the motor current is carried out so that a deviation between a command rpm fo supplied to the motor and an actual rpm f becomes zero, under the state where the amplitude of the current supplied to the motor is maintained at a constant value.

To be specific, the motor driving apparatus 100b comprises an inverter circuit 3 for converting an output voltage of the power supply 1 into a three-phase AC and outputting the three-phase AC to the motor 2, and an inverter control unit 4b for controlling the inverter circuit 3.

The inverter control unit 4b supplies the inverter circuit 3 with a drive signal Sg so that the brushless motor 2 is driven at a rpm required by the user. The inverter control unit 4b comprises a rotor position estimation unit 5, an advance angle determination unit 6a, a command current waveform generation unit 8b, and a PWM generation unit 9.

Hereinafter, the motor driving apparatus 100b will be described in more detail.

The power supply 1, the inverter circuit 3, the rotor position estimation unit 5, and the advance angle determination unit 6a are identical to those of the motor driving apparatus 100a according to the first embodiment.

The command current waveform generation unit 8b receives the estimated phase θ outputted from the rotor position estimation unit 5, and the advance angle β determined by the advance angle determination unit 6a, and generates a waveform of a current command value (command current) Io to be supplied from the inverter circuit 3 to the brushless motor 2. To be specific, the waveform of the command current Io, which is generated by the command current waveform generation unit 8, is a sinusoidal wave having both of a command amplitude of the current supplied to the motor (the amplitude of the command current), and a phase obtained by adding the advance angle β to the estimated phase θ. The command amplitude is a fixed value, and it is a maximum amplitude allowed by the brushless motor 2.

The PWM generation unit 9 receives the actual current I outputted from the inverter circuit 3 to the brushless motor 2, and the command current Io generated by the command current waveform generation unit 8b, and generates a pulse signal as a drive signal Sg to be supplied to the inverter circuit 3 so that a deviation between the waveform of the command current Io and the waveform of the actual current I becomes zero. To be specific, the PWM generation unit 9 performs PI control for a difference between the command current Io and the actual current to determine a PWM (Pulse Width Modulation) width of the pulse signal so that a deviation between the waveform of the command current Io and the waveform of the actual current I becomes zero.

Next, the operation will be described.

In the motor driving apparatus 100b according to the second embodiment, the inverter circuit 3 operates in like manner as that of the motor driving apparatus 100a according to the first embodiment, and the motor 2 is driven by the output from the inverter circuit 3.

At this time, in the inverter control unit 4b, a pulse signal as a drive signal Sg to be supplied to the gates of the switching elements 31 to 36 is generated on the basis of the command rpm fo indicated by the command signal supplied from the outside, and the current (motor current) I supplied to the motor 2.

Hereinafter, the operations of the respective components 5, 6a, 8b, and 9 of the inverter control unit 4b will be described.

In this second embodiment, the operation of the rotor position estimation unit 5 for estimating the rotor position θ from the motor current I, and the operation of the advance angle determination unit 6a for determining the advance angle β of the motor current are identical to those described for the first embodiment.

Then, the command current waveform generation unit 8b generates a waveform of a command current Io having an amplitude equal to the command amplitude and a phase equal to the sum of the estimated phase θ and the advance angle β, on the basis of the estimated phase θ outputted from the rotor position estimation unit 5 and the advance angle β determined by the advance angle determination unit 6a. The command amplitude is maintained at a maximum value allowed by the brushless motor 2.

The PWM generation unit 9 determines the PWM width of the pulse signal (drive signal Sg) to be supplied to the inverter circuit 3 so that a deviation between the waveform of the command current Io and the waveform of the actual motor current I becomes zero. To be specific, the PWM width of the pulse signal is determined by performing PI control for a difference between the command current Io and the actual current I.

Figure 4:
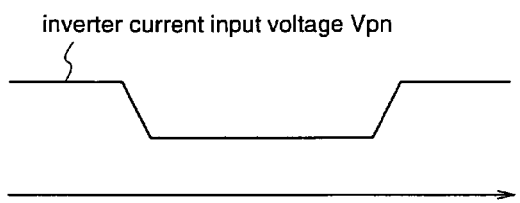
FIG. 4($a$) is a waveform diagram for explaining the operation of the motor driving apparatus according to the second embodiment, and illustrating a waveform of an input voltage.
Figure 4:
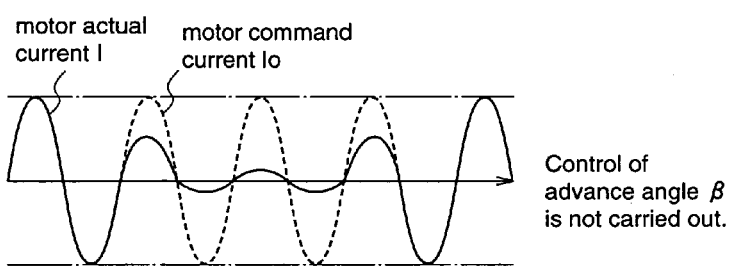
Figure 4:
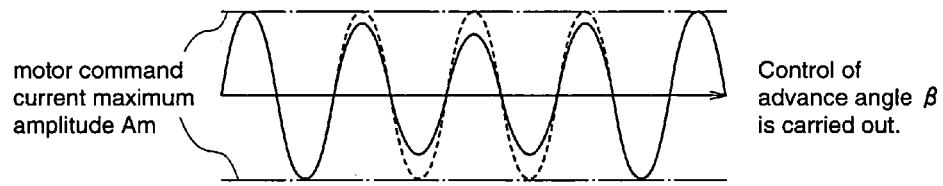

FIGS. 4(*a*)–4(*c*) are conceptual diagrams for explaining the effects of the second embodiment. More specifically, FIG. 4(*a*) shows variations in the input voltage of the inverter circuit, FIG. 4(*b*) shows variations in the motor current in the case where control of the advance angle β is not carried out, and FIG. 4(*c*) shows variations in the motor current in the case where control of the advance angle β is carried out. In these figures, Io is the command current to be supplied to the motor, I is the actual current that actually flows in the motor, and Am is the maximum amplitude of the command current.

When control of the advance angle β is not carried out, the command current cannot be supplied to the motor as required in the operation section where the input voltage Vpn of the inverter circuit 3 is low. On the other hand, when control of the advance value β is carried out, the amount of current supplied to the motor is increased by controlling the advance angle β in the operation section where the input voltage Vpn of the inverter circuit 3 is low. As a result, even when the output voltage of the power supply is reduced, required motor torque can be secured to realized the command rpm by controlling the advance angle of the motor current.

As described above, the motor driving apparatus 100b according to the second embodiment is provided with the inverter circuit 3 for converting the output voltage of the power supply 1 into three-phase AC and outputting the same to the motor 2, and the inverter control unit 4b for controlling the advance angle β of the current (motor current) supplied from the inverter circuit 3 to the motor 2. The inverter control unit 4b determines the advance angle β so that a deviation between the command rpm fo and the actual rpm f is minimized, under the state where the amplitude of the command value (command current) Io of the motor current is fixed to the maximum value. Therefore, as in the first embodiment, weak field control for the brushless motor can be carried out with stability, without using control variables such as predetermined table values or the like.

Further, in this second embodiment, since the maximum amplitude of the motor current that is maintained at a constant value is equal to the maximum current value that is allowed by the brushless motor 2, even when weak field control is carried out, a current that is not allowed by the brushless motor 2, i.e., a motor current that deteriorates the brushless motor 2 due to demagnetization, does not flow, thereby providing a safe motor driving apparatus.

Embodiment 3

Figure 5:
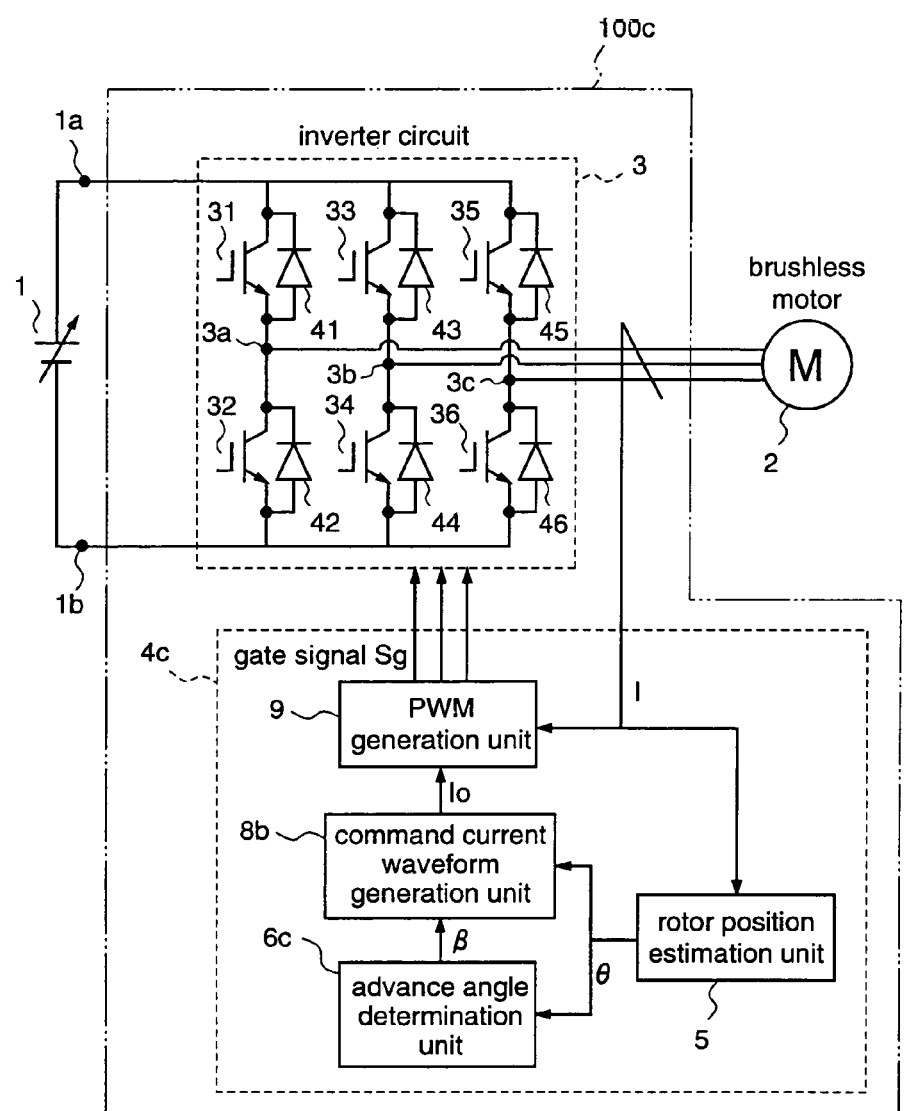
FIG. 5 is a block diagram for explaining a motor driving apparatus according to a third embodiment of the present invention.

FIG. 5 is a block diagram for explaining a motor driving apparatus according to a third embodiment of the present invention.

A motor driving apparatus 100c according to the third embodiment has an input connected to the power supply 1, and drives the brushless motor 2 at an arbitrary rpm, like the motor driving apparatus 100b according to the second embodiment. Further, the motor driving apparatus 100c performs weak field control of the brushless motor 2 by adjusting the advance angle β of the motor current so that the actual motor rpm f becomes maximum.

To be specific, the motor driving apparatus 100c comprises an inverter circuit 3 for converting an output voltage of the power supply 1 into a three-phase AC and outputting the three-phase AC to the motor 2, and an inverter control unit 4c for controlling the inverter circuit 3.

The inverter control unit 4c supplies the inverter circuit 3 with a drive signal Sg so that the brushless motor 2 is driven at an rpm required by the user. The inverter control unit 4c comprises a rotor position estimation unit 5, an advance angle determination unit 6c, a command current waveform generation unit 8b, and a PWM generation unit 9.

The power supply 1, the inverter circuit 3, the rotor position estimation unit 5, the command current waveform generation unit 8b, and the PWM generation unit 9 are identical to those of the motor driving apparatus 100b according to the second embodiment.

The advance angle determination unit 6c receives the estimated phase θ outputted from the rotor position estimation unit 5, and determines the advance angle β of the motor current so that the rpm f of the brushless motor 2, which is obtained by differentiating the estimated phase θ, becomes maximum under the condition that the amplitude of the command current waveform is constant. As a specific method for determining the advance angle β, the hill-climbing method may be employed.

Next, the operation will be described.

In the motor driving apparatus 100c according to the third embodiment, the rotor position estimation unit 5, the command current waveform generation unit 8b, and the PWM generation unit 9 operate in like manners as those described for the second embodiment, and therefore, only the operation of the advance angle determination unit 6c will be described hereinafter.

Figure 6:
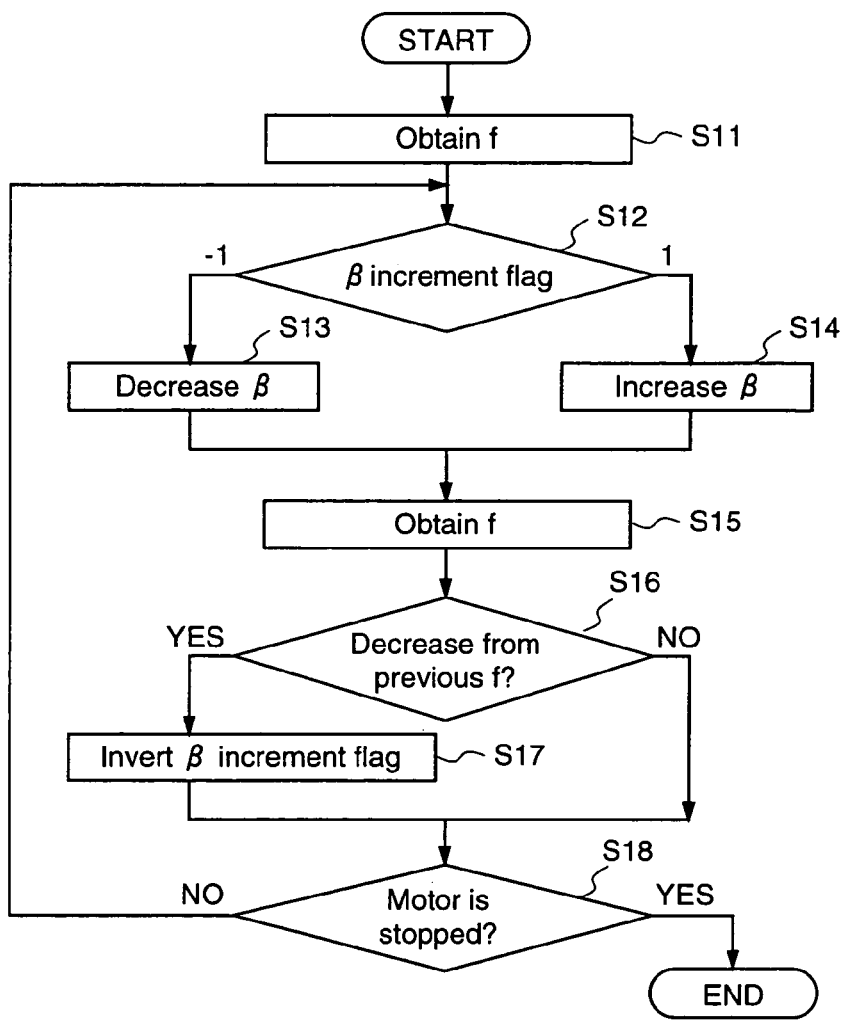
FIG. 6 is a flowchart for explaining the operation of an advance angle determination unit included in the motor driving apparatus according to the third embodiment, and illustrating a process flow of a hill-climbing method as an example of an advance angle determination method.

FIG. 6 is a flowchart of a process of determining the advance angle β by the advance angle determination unit 6c using the hill-climbing method.

In this third embodiment, the advance angle determination unit 6c repeats process steps S11 to S18 shown in FIG. 6. However, when the amplitude of the command current changes, the advance angle determination unit 6c stops the operation of performing the process steps S11 to S18 until the adverse effect of the amplitude change in the command current subsides, so as to prevent the advance angle β from diverging.

Initially, in step S11, the actual rpm f of the motor 2 is obtained on the basis of the estimated rotor phase from the rotor position estimation unit 5.

Next, in step S12, it is determined as to which of the process in step S13 and the process in step S14 should be carried out, on the basis of a predetermined value of a β increment flag. That is, when the value of the β increment flag is [−1], the process in step S13 is carried out. When the value of the β increment flag is [1], the process in step S14 is carried out. When the flow shown in FIG. 6 is started, i.e., in step S12, the value of the β increment flag is either [1] or [−1] that is previously set as an initial value.

In step S13, a process of decreasing (delaying) the advance angle β that is currently outputted is carried out. The amount of decrease in the advance angle β in step S13 may be a predetermined constant value, or it may be determined on the basis of a difference between the previously obtained rpm f and the presently obtained rpm f. When the amount of decrease in the advance angle β is determined on the basis of the rpm deviation as described above, the velocity of hill-climbing (i.e., the velocity of the process for determining the advance angle by the hill-climbing method) increases, whereby the advance angle β at which the actual rpm becomes maximum can be determined with high responsivity.

In step S14, a process of increasing (advancing) the advance angle β that is currently outputted is carried out. The amount of increase in the advance angle β in step S14 may be a predetermined constant value, or it may be determined on the basis of a difference between the previously obtained rpm f and the presently obtained rpm f. When the amount of increase in the advance angle β is determined on the basis of the rpm deviation as described above, the velocity of hill-climbing increases, whereby the advance angle β at which the actual rpm f becomes maximum can be determined with high responsivity.

Thereafter, in step S15, a process of obtaining the actual rpm f is carried out again under the state where the advance angle β of the motor current is updated to the advance angle β that is determined in step S13 or S14.

Further, in step S16, a difference between the previous actual rpm f that is obtained before the updation of the advance angle β to the advance angle β determined in step S13 or S14, and the actual rpm f after the updation of the advance angle β, is calculated, and then it is judged as to whether the actual rpm f after the updation of the advance angle β is decreased or not. When the actual rpm f after the updation of the advance angle β is decreased as compared with the actual rpm f before the updation, a process of step S17 is carried out. When the actual rpm f after the updation of the advance angle β is increased as compared with the actual rpm f before the updation, a process of step S18 is carried out.

In step S17, since the direction in which the advance angle β should be changed is incorrect, a process of inverting the sign of the β increment flag is carried out, followed by step S18.

In step S18, it is judged as to whether the motor is stopped or not. When the motor is stopped, the advance angle determination process by the advance angle determination unit 6c is ended. When the motor is not stopped, the process in step S12 is performed again.

Through the above-mentioned steps S11 to S18, an optimum advance angle with which the reluctance torque of the brushless motor can be utilized at maximum is obtained by a relatively simple construction.

As described above, the motor driving apparatus according to the third embodiment is provided with the inverter circuit 3 for converting the output voltage of the power supply 1 into a three-phase AC and outputting the three-phase AC to the motor 2, and the inverter control unit 4c for controlling the advance angle β of the current (motor current) supplied from the inverter circuit 3 to the motor 2. The inverter control unit 4c determines the advance angle β so that the actual motor rpm becomes maximum under the state where the amplitude of the command current is kept constant, and generates a pulse signal to be supplied to the inverter circuit 3 on the basis of the determined advance angle β. Therefore, the advance angle of the motor current, which is a control variable used in weak field control for the brushless motor, can be optimized by a relatively simple construction. Since the optimum advance angle enables maximum utilization of the reluctance torque of the brushless motor in which the motor rpm becomes maximum, the brushless motor can be driven at a minimum current value that satisfies the required torque, resulting in maximum motor driving efficiency.

Further, since the advance angle is controlled so that the motor rpm becomes maximum, even when an error occurs between the estimated rotor position and the actual rotor position due to variations in the various constants that constitute the brushless motor, the advance angle is adjusted so as to absorb the error. Thereby, it is possible to achieve the maximum efficiency of the brushless motor and, furthermore, avoid a phenomenon in which an error occurs in the estimated rotor position and thereby the brushless motor loses synchronization, resulting in stable motor driving.

Embodiment 4

Figure 7:
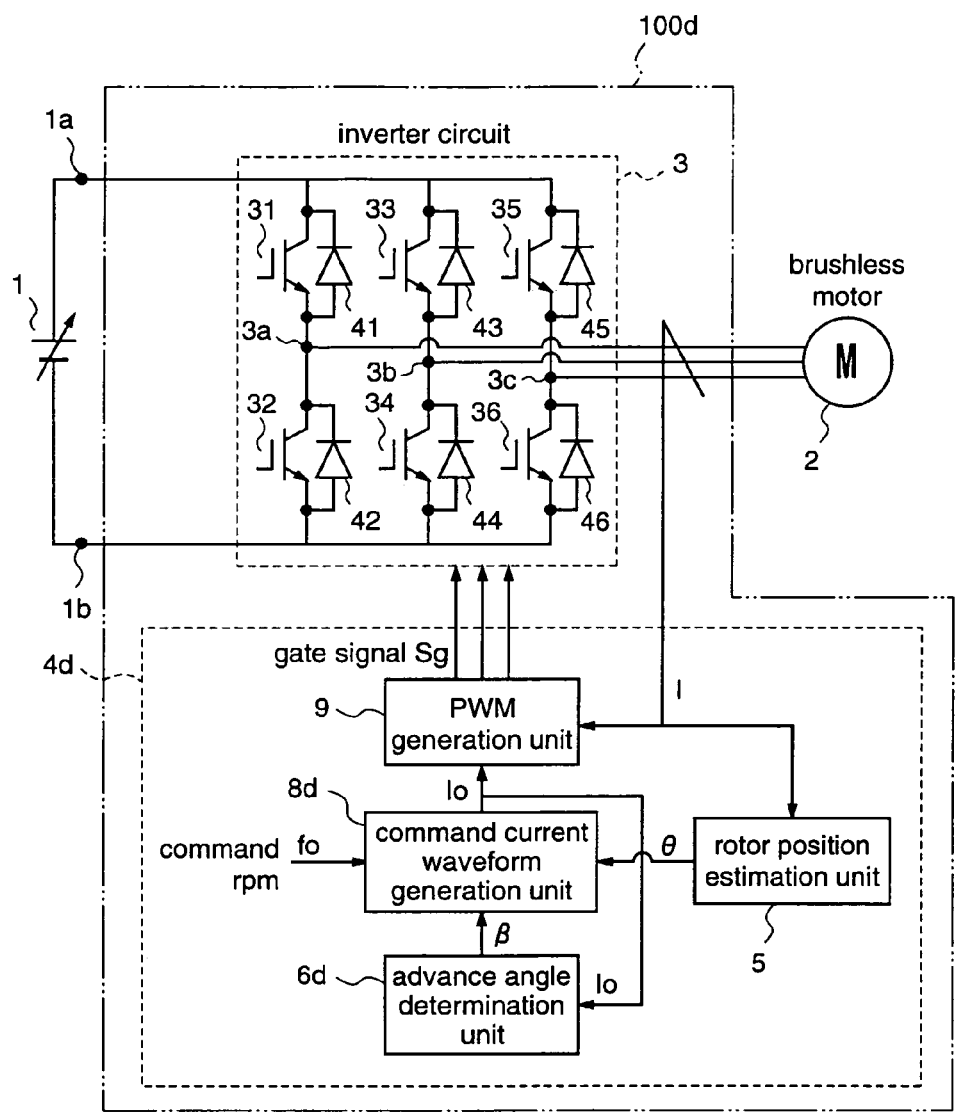
FIG. 7 is a block diagram for explaining a motor driving apparatus according to a fourth embodiment of the present invention.

FIG. 7 is a block diagram for explaining a motor driving apparatus according to a fourth embodiment of the present invention.

A motor driving apparatus 100d according to the fourth embodiment has an input connected to the power supply 1, and drives the brushless motor 2 at an arbitrary rpm, like the motor driving apparatus 100b according to the second embodiment. Further, the motor driving apparatus 100d performs weak field control of the brushless motor 2 by adjusting the advance angle β of the motor current so that the amplitude of the command current Io becomes maximum.

To be specific, the motor driving apparatus 100d comprises an inverter circuit 3 for converting the output voltage of the power supply 1 into three-phase AC and outputting the same to the motor 2, and an inverter control unit 4d for controlling the inverter circuit 3.

The inverter control unit 4d supplies the inverter circuit 3 with a drive signal Sg so that the brushless motor 2 is driven at a rpm required by the user. The inverter control unit 4d comprises a rotor position estimation unit 5, an advance angle determination unit 6*d*, a command current waveform generation unit 8*d*, and a PWM generation unit 9.

The power supply 1, the inverter circuit 3, the rotor position estimation unit 5, and the PWM generation unit 9 are identical to those of the motor driving apparatus 100*b* according to the second embodiment.

The command current waveform generation unit 8*d* receives the command rpm fo indicated by the command signal from the outside, the estimated rotor phase θ outputted from the rotor position estimation unit 5, and the advance angle β of the motor current outputted from the advance angle determination unit 6*d*, and generates a waveform of the command current Io to be supplied from the inverter circuit 3 to the brushless motor 2. To be specific, the command current waveform generation unit 8*d* generates, as a waveform of the command current Io, a sinusoidal wave having both of a command amplitude of the motor current and a phase obtained by adding the advance angle β to the estimated phase θ. The command amplitude of the motor current is determined so that a deviation between the command rpm fo indicated by the external command signal and the actual rpm f obtained by differentiating the estimated phase θ outputted from the rotor position estimation unit 5 becomes zero. For example, the command amplitude is obtained by performing PI control for the command rpm fo and the actual rpm f.

The advance angle determination unit 6*d* receives the command current Io generated by the command current waveform generation unit 8*d*, and controls the advance value β so that the amplitude of the command current Io is minimized, under the condition that the command rpm fo is constant. As a specific control method by the advance angle determination unit 6*d*, the hill-climbing method may be employed.

While in this fourth embodiment the advance angle determination unit 6*d* receives the command current Io generated by the command current waveform generation unit 8*d*, it may receive only the amplitude of the command current Io.

Next, the operation will be described.

In this fourth embodiment, the output voltage of the power supply 1 is converted into three-phase AC by the inverter circuit 3 to be supplied to the motor 2, whereby the motor 2 is driven.

At this time, the inverter control unit 4*d* generates a pulse signal to be applied as a drive signal Sg to the gates of the switching elements 31 to 36, on the basis of the command rpm fo indicated by the external command signal, and the current (motor current) I supplied to the motor 2.

To be specific, in the rotor position estimation unit 5, the rotor position is estimated from the current (motor current) I supplied from the inverter circuit 3 to the brushless motor 2.

The command current waveform generation unit 8*d* generates a waveform of the command current Io to be supplied from the inverter circuit 3 to the brushless motor 2, on the basis of the command rpm fo indicated by the external command signal, the estimated rotor phase θ outputted from the rotor position estimation unit 5, and the advance angle β of the motor current outputted from the advance angle determination unit 6*d*. To be specific, the command current waveform generation unit 8*d* determines the amplitude of the command current Io so that a deviation between the command rpm fo indicated by the external command signal and the actual rpm f obtained by differentiating the estimated phase θ outputted from the rotor position estimation unit 5 becomes zero. For example, the amplitude of the command current Io is obtained by performing PI control for the command rpm fo and the actual rpm f. Further, the phase of the command current is obtained by adding the advance angle β to the estimated rotor phase θ.

The advance angle determination unit 6*d* receives the command current Io generated by the command current waveform generation unit 8*d*, and determines the advance angle β so that the amplitude of the command current Io becomes minimum, under the condition that the command rpm fo is constant. As a specific method for controlling the advance angle by the advance angle determination unit 6*d*, the hill-climbing method may be employed.

The PWM generation unit 9 determines the PWM width of the pulse signal (drive signal Sg) to be supplied to the inverter circuit 3 so that the deviation between the command current Io and the actual motor current I becomes zero. To be specific, the PWM width of the pulse signal is determined by performing PI control for the difference between the command current Io and the actual current I.

Figure 8:
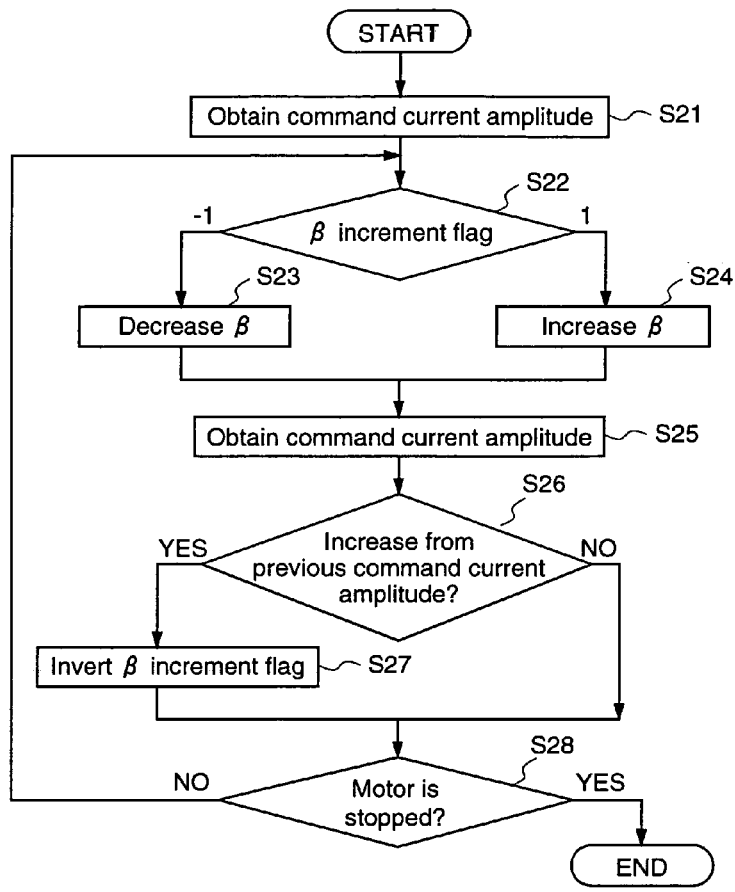
FIG. 8 is a flowchart for explaining the operation of an advance angle determination unit included in the motor driving apparatus according to the fourth embodiment, and illustrating a process flow of a hill-climbing method as an example of an advance angle determination method.

FIG. 8 is a flowchart illustrating a process of determining the advance angle β by the advance angle determination unit 6*d* using the hill-climbing method.

In this fourth embodiment, the advance angle determination unit 6*d* repeats process steps S21 to S28 shown in FIG. 8. However, when the command rpm fo changes, the advance angle determination unit 6*d* stops the operation of performing the process steps S21 to S28 until the adverse effect of the change in the command rpm fo subsides, thereby to prevent the advance angle β from diverging.

Initially, in step S21, the amplitude of the command current Io is obtained on the basis of the command rotation fo and the actual rpm f obtained by differentiating the estimated rotor phase θ.

Next, in step S22, it is determined as to which of the process in step S23 and the process in step S24 should be carried out, on the basis of a predetermined value of a β increment flag. That is, when the value of the β increment flag is [−1], the process in step S23 is carried out. When the value of the β increment flag is [1], the process in step S24 is carried out. When the flow shown in FIG. 8 is started, i.e., in step S22, the value of the β increment flag is either [1] or [−1] that is previously set as an initial value.

In step S23, a process of decreasing (delaying) the advance angle β that is currently outputted is carried out. The amount of decrease in the advance angle β in step S23 may be a predetermined constant value, or it may be determined on the basis of a difference between the amplitude of the previously obtained command current Io and the amplitude of the presently obtained command current Io. When the amount of decrease in the advance angle β is determined on the basis of the deviation as described above, the velocity of hill-climbing (i.e., the velocity of the process for determining the advance angle by the hill-climbing method) increases, whereby the advance angle β at which the amplitude of the command current Io becomes minimum can be determined with high responsivity.

In step S24, a process of increasing (advancing) the advance angle β that is currently outputted is carried out. The amount of increase in the advance angle β in step S24 may be a predetermined constant value, or it may be determined on the basis of a difference between the amplitude of the previously obtained command current Io and the amplitude of the presently obtained command current Io. When the amount of increase in the advance angle β is determined on the basis of the deviation as described above, the velocity of hill-climbing increases, whereby the advance angle β at which the amplitude of the command current Io becomes minimum can be determined with high responsivity.

Thereafter, in step S25, the brushless motor is driven under the state where the advance angle β of the motor current is updated to the advance angle β that is determined in step S23 or S24, and then the process of obtaining the amplitude of the command current I is carried out again.

Further, in step S26, a difference between the amplitude of the command current that is obtained before the advance angle β of the motor current is updated to the advance angle β determined in step S23 or S24, and the amplitude of the command current after the update, is calculated, and then it is judged as to whether the amplitude of the command current after the update of the advance angle β is increased or not as compared with the amplitude of the command current before the update. When the amplitude of the command current after the update of the advance angle β is increased as compared with the amplitude before the update, a process of step S27 is carried out. When the amplitude of the command current after the updation of the advance angle β is decreased or equal to the amplitude of the command current before the updation, a process of step S28 is carried out.

In step S27, since the direction in which the advance angle β should be changed is incorrect, a process of inverting the sign of the β increment flag is carried out, followed by step S28.

In step S28, it is judged as to whether the motor is stopped or not. When the motor is stopped, the advance angle determination process by the advance angle determination unit 6c is ended. When the motor is not stopped, the process in step S22 is performed again.

Through the above-mentioned steps S21 to S28, an optimum advance angle, i.e., an advance angle with which the reluctance torque of the brushless motor can be utilized at maximum, can be obtained from the current supplied to the brushless motor and he estimated rotor position, by the relatively simple construction.

As described above, the motor driving apparatus according to the fourth embodiment is provided with the inverter circuit 3 for converting the output voltage of the power supply 1 into a three-phase AC and outputting the three-phase AC to the motor 2, and the inverter control unit 4d for controlling the advance angle β of the current (motor current) supplied from the inverter circuit 3 to the motor 2. The inverter control unit 4d determines the advance angle β so that the amplitude of the command current becomes minimum under the state where the command rpm fo is kept constant, and generates a pulse signal to be supplied to the inverter circuit 3 on the basis of the determined advance angle β. Therefore, an optimum advance angle can be obtained by the relatively simple construction. Since the optimum advance angle enables maximum utilization of the reluctance torque of the brushless motor, in which the motor rpm attains the maximum value, the brushless motor can be driven with the minimum current value that satisfies the required torque, whereby the motor driving efficiency can be maximized.

Further, since the advance angle is controlled so that the amplitude of the command current becomes minimum, even when an error occurs between the estimated rotor position and the actual rotor position due to variations in the various constants that constitute the brushless motor, the advance angle is adjusted to absorb the error. Thereby, it is possible to achieve the maximum efficiency of the brushless motor and, furthermore, avoid a phenomenon in which an error occurs in the estimated rotor position and thereby the brushless motor loses synchronization, resulting in stable motor driving.

Embodiment 5

Figure 9:
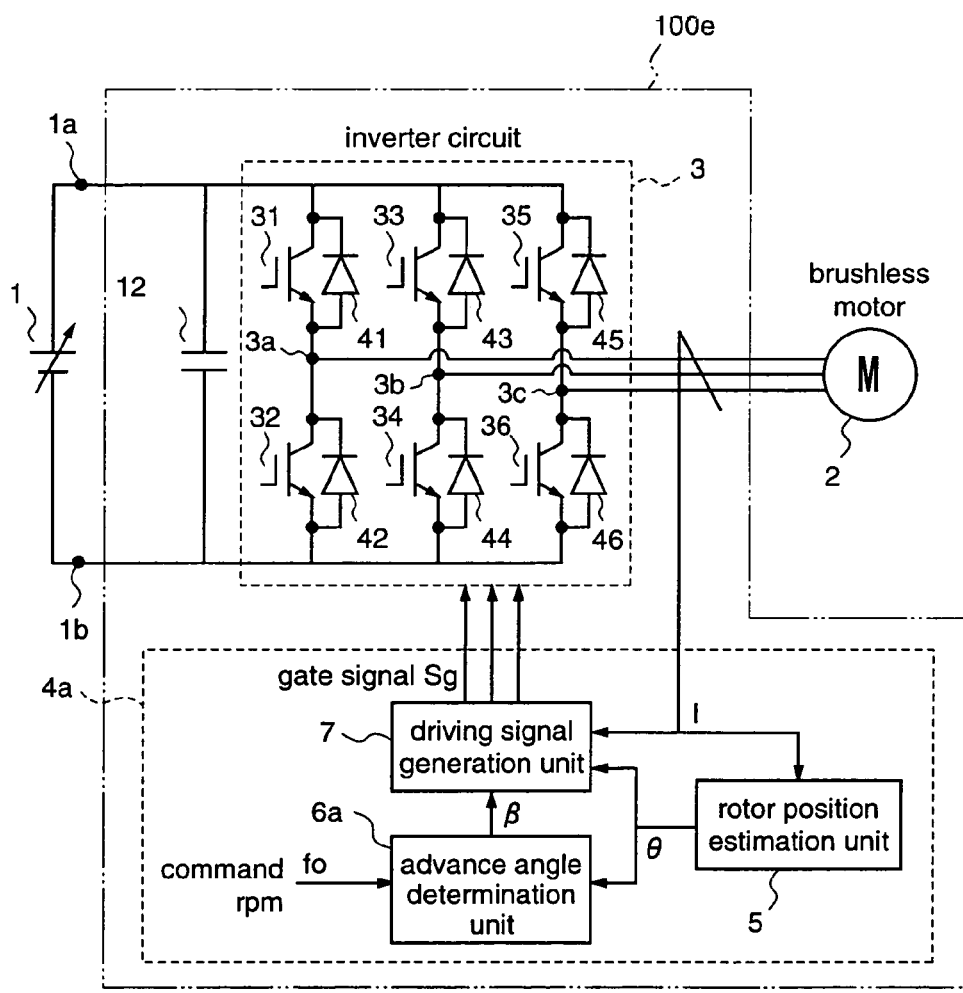
FIG. 9 is a block diagram for explaining a motor driving apparatus according to a fifth embodiment of the present invention.

FIG. 9 is a block diagram for explaining a motor driving apparatus according to a fifth embodiment of the present invention.

A motor driving apparatus 100e according to the fifth embodiment is obtained by adding a small-capacitance capacitor 12 for charging a regenerative current from the motor, to the input end of the inverter circuit 3 of the motor driving apparatus 100a according to the first embodiment. The capacitor 12 is connected between an output terminal 1a and the other output terminal 1b of the power supply 1.

The other constituents of the motor driving apparatus 100e according to the fifth embodiment are identical to those of the motor driving apparatus 100a according to the first embodiment.

The capacitance of the capacitor 12 may be set to such extent that prevents damages on the apparatus due to the motor regenerative current. For example, when the motor control apparatus controls a motor of a compressor used in a home-use air conditioner, the capacitance of the capacitor 12 is about 0.1 μF~ 50 μF. This value is the minimum threshold value that is obtained from the capacitance of the inductance of the motor, the maximum amount of variation that is allowed for the inverter input voltage, and the maximum value of the current that flows into the motor.

To be specific, the energy that is held by the motor when the maximum current flows in the motor is obtained from the capacitance of the inductance. The capacitance of the capacitor is determined on the basis of the extent to which an increase in the terminal voltage of the capacitor is allowed, which occurs when the energy is given to the capacitor as a motor regenerative current.

To be specific, assuming that the maximum current supplied into the motor is Im, the inductance in the motor is Lm, and the allowable increase in the capacitor terminal voltage is Vm, the capacitance Cm of the capacitor is determined by Cm>Lm·Im·Im/Vm/Vm.

Next, the operation will be described.

In the motor driving apparatus 100e according to the fifth embodiment, the inverter circuit 3 and the inverter control unit 4a operate in like manners as those of the first embodiment, and therefore, repeated description is not necessary.

When the motor 2 is stopped or the switching operation of the inverter circuit 4 is stopped, the current that flows in the motor 2 is regenerated at the input side of the inverter circuit 3. When the regenerative current is large, the voltage at the input end of the inverter circuit 4 becomes excessively large, resulting in damage to the motor driving apparatus.

In the motor driving apparatus 100e according to the fifth embodiment, since the capacitor 12 is added at the input end of the inverter circuit 3 as shown in FIG. 9, the regenerative current from the motor 2 charges the capacitor 12 when the motor 2 is stopped, thereby suppressing an increase in the voltage at the input end of the inverter circuit 3 due to the regenerative current.

Thereby, the motor driving apparatus is prevented from being damaged by the motor regenerative current that occurs when the motor is stopped, resulting in a motor control apparatus with a higher level of safety.

As described above, according to the fifth embodiment, the inverter circuit 3 of the motor driving apparatus 10a according to the first embodiment is provided with the capacitor for charging the regenerative current from the motor. Therefore, in addition to the effects of the first embodiment, it is possible to suppress an increase in the inverter input voltage that occurs when the motor is stopped or the switching operation of the inverter circuit is stopped, thereby avoiding destruction of components or the like.

In this fifth embodiment, the capacitor for charging the regenerative current from the motor is added at the input end of the inverter circuit 3 of the motor driving apparatus 100*a* of the first embodiment. However, the motor driving apparatus according to any of the second to fourth embodiments may be provided with such capacitor.

Embodiment 6

Figure 10:
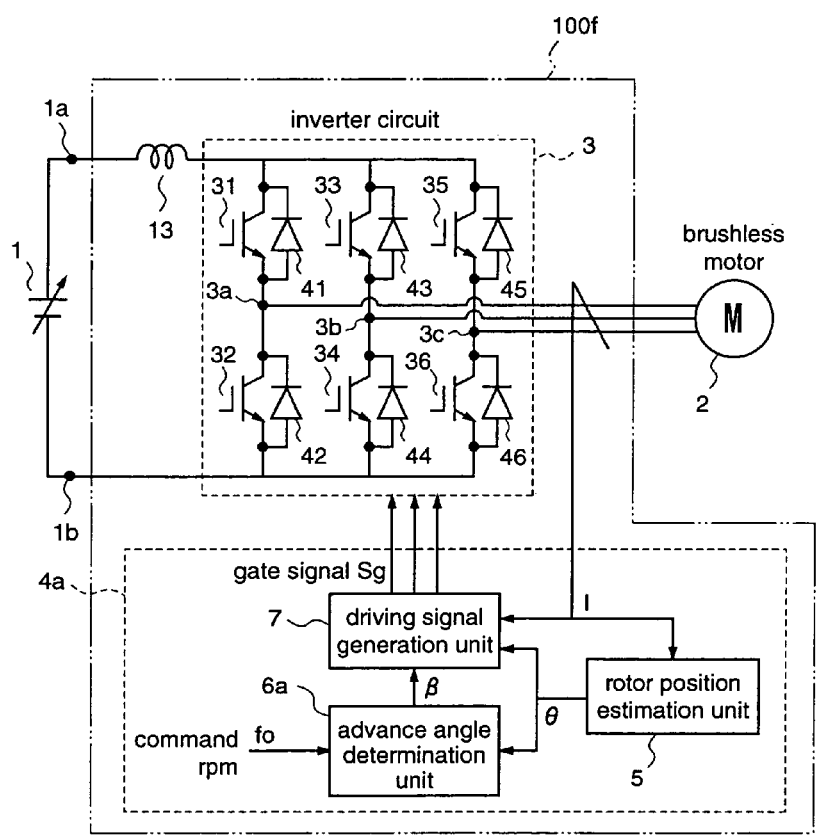
FIG. 10 is a block diagram for explaining a motor driving apparatus according to a sixth embodiment of the present invention.
Figure 11:
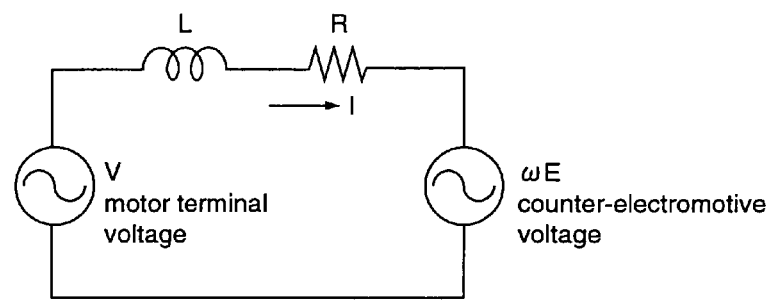
FIG. 11(a) is a diagram illustrating a motor equivalent circuit for explaining weak field control of a motor, which is a conventional technique.
FIG. 11(b) is a graph for explaining a weak field control of a motor, as a conventional technique, and illustrating a field current and a torque current used in vector control of the motor.
Figure 11:
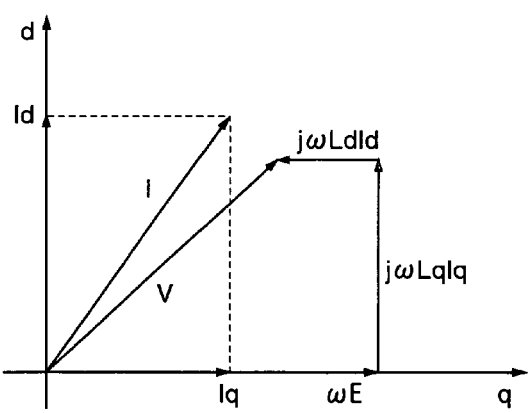

FIG. 10 is a block diagram for explaining a motor driving apparatus according to a sixth embodiment of the present invention.

A motor driving apparatus 100*f* according to the sixth embodiment is obtained by inserting an inductor 13 between the inverter circuit 3 and the power supply 1 of the motor driving apparatus 10*a* according to the first embodiment, and the inductor 13 is connected in series between the power supply 1 and the inverter circuit 3.

The other constituents of the motor driving apparatus 100*f* are identical to those of the motor driving apparatus 100*a* according to the first embodiment.

The capacitance of the inductor 13 may be set to such extent that eliminates switching current noise caused by switching operation of the inverter circuit, and prevents distortion of the waveform of the power supply current. For example, when the motor driving apparatus drives a motor of a compressor used in a home-use air conditioner, the value of the inductor 13 is about 0.01 mH to 4.0 mH. This value is in proportion to the inverse of the carrier frequency in the inverter circuit 3, and it is determined so as to suppress the harmonics of the carrier components.

To be specific, assuming that the amount to be attenuated is $-X[dB]$, the circular constant is $\pi$, and the carrier frequency is $f[Hz]$, the inductor value Lr is determined as a value that satisfies $10 \times \log(2 \times \pi \times f \times L) > X$.

Next, the operation will be described.

In the motor driving apparatus 100*f* according to the sixth embodiment, the inverter circuit 3 and the inverter control unit 4*a* operate in like manners as those of the first embodiment, and therefore, repeated description is not necessary.

The output current of the power supply 1 is affected by the switching operation of the inverter circuit 3, and the switching current is superimposed as noise.

In the motor driving apparatus 100*f* according to the sixth embodiment, as shown in FIG. 10, the noise that occurs in the inverter circuit 3 is cut by the inductor 13 inserted between the power supply 1 and the inverter circuit 3, whereby the power supply switching noise superimposed on the output current of the power supply is reduced. Thereby, the waveform of the output current of the power supply 1 is prevented from being distorted, resulting in improved power factor of the input current.

As described above, according to the sixth embodiment of the present invention, the inductor 13 for cutting the noise that occurs in the inverter circuit 3 is inserted between the input terminal of the inverter circuit 3 and the power supply 1 of the motor driving apparatus 100*a* of the first embodiment. Therefore, in addition to the effects of the first embodiment, the switching noise superimposed on the output of the power supply 1 is reduced, whereby the power factor of the input current is increased, resulting in improved current waveform.

While in this sixth embodiment the inductor 13 for cutting the noise that occurs in the inverter circuit 3 is inserted between the inverter circuit 3 and the power supply 1 of the motor driving apparatus 100*a* of the first embodiment, the motor driving apparatus according to any of the second to fourth embodiments may be provided with such inductor.

Further, the motor driving apparatus according to the fifth embodiment is provided with the capacitor at the input end of the inverter circuit, and the motor driving apparatus according to the sixth embodiment is provided with the capacitor between the inverter circuit and the power supply. However, the motor driving apparatus may be provided with both of the capacitor and the inductor.

In this case, since a circuit comprising an inductor and a capacitor connected in series is created, a resonance phenomenon might occur. This resonance frequency is $1/2\pi\sqrt{(LC)}$ as generally *known*, and it depends on the capacitances of the inductor and *capacitor*. A*ccordingly*, a motor control apparatus of less noise can be provided by determining the capacitances of the inductor and capacitor so that the resonance frequency becomes higher than the frequency to be a target of harmonics regulation to the power *supply*.

Furthermore, the motor driving apparatus according to the present invention is not restricted to that for controlling a motor of a compressor used in an air conditioner, and it may control a motor of any equipment so long as it controls the motor using an inverter circuit.

For example, equipment to which the motor driving apparatus according to the present invention is applicable includes a refrigerator, an electric washing machine, an electric dryer, an electric vacuum cleaner, an air blower, a heat pump type hot-water supply unit, and the like, in which a motor and an inverter circuit for generating a motor driving current are mounted. In any equipment, a reduction in cost and a high degree of freedom in design can be realized by reducing the size and weight of the inverter circuit.

Hereinafter, a description will be given of specific examples of an air conditioner, a refrigerator, an electric washing machine, an air blower, a vacuum cleaner, a dryer, and a heat pump type hot-water supplier, using the motor and motor driving apparatus of the first embodiment.

Embodiment 7

Figure 12:
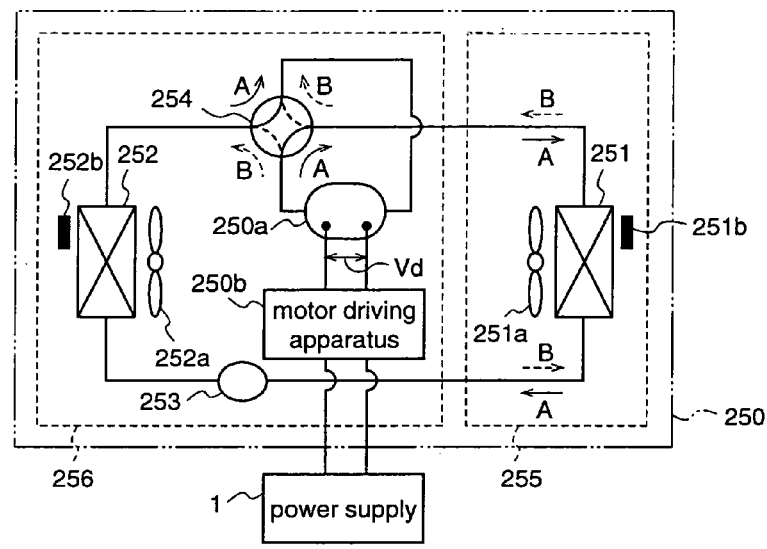
FIG. 12 is a schematic diagram for explaining an air conditioner according to a seventh embodiment of the present invention.

FIG. 12 is a block diagram for explaining an air conditioner according to a seventh embodiment of the present invention.

An air conditioner 250 according to the seventh embodiment has an indoor unit 255 and an outdoor unit 256, and performs cooling and heating.

The air conditioner 250 is provided with a compressor 250*a* for circulating a refrigerant between the indoor unit 255 and the outdoor unit 256, and a motor driving unit 250*b* for driving a motor of the compressor 250*a* with a voltage supplied from a power supply 1. In FIG. 12, the power supply 1, the motor of the compressor 250*a*, and the motor driving apparatus 250*b* are identical to the power supply 1, the brushless motor 2, and the motor driving apparatus 100*a* according to the first embodiment, respectively.

Further, the air conditioner 250 has a four-way valve 254, a throttle 253, an indoor heat exchanger 251, and an outdoor heat exchanger 252. The indoor heat exchanger 251 is a component of the indoor unit 255, while the throttle 253, the outdoor heat exchanger 252, the compressor 250*a*, the four-way valve 254, and the motor driving apparatus 250*b* are components of the outdoor unit 256.

The indoor heat exchanger 251 has an air blower 251*a* for increasing the efficiency of heat exchange, and a temperature sensor 251*b* for measuring the temperature of the heat exchanger 251 or the ambient temperature thereof. The outdoor heat exchanger 252 has an air blower 252*a* for increasing the efficiency of heat exchange, and a temperature sensor 252*b* for measuring the temperature of the heat exchanger 252 or the ambient temperature thereof.

In this seventh embodiment, the compressor 250*a* and the four-way valve 254 are placed in the refrigerant path between the indoor heat exchanger 251 and the outdoor heat exchanger 252. That is, in this air conditioner 250, the four-way valve 254 selects either of two states as follows: the state where the refrigerant flows in the direction of arrow A, the refrigerant that has passed through the outdoor heat exchanger 252 is sucked into the linear compressor 250*a*, and the refrigerant discharged from the linear compressor 250*a* is supplied to the indoor heat exchanger 251, and the state where the refrigerant flows in the direction of arrow B, the refrigerant that has passed through the indoor heat exchanger 251 is sucked into the linear compressor 250*a*, and the refrigerant discharged from the linear compressor 250*a* is supplied to the outdoor heat exchanger 252.

Further, the throttle 253 has both the function of reducing the flow rate of the circulating refrigerant, and the function as a valve for automatically controlling the flow rate of the refrigerant. That is, under the state where the refrigerant is circulating in the refrigerant circulation path, the throttle 253 reduces the flow rate of the fluid refrigerant outputted from the condenser to the evaporator to expand the fluid refrigerant, and supplies a proper amount of refrigerant that is required for the evaporator.

The indoor heat exchanger 251 operates as the condenser during heating and as the evaporator during cooling. The outdoor heat exchanger 252 operates as the evaporator during heating and as the condenser during cooling. In the condenser, the high-temperature and high-pressure refrigerant gradually liquefies while losing heat to the air that is blown into the condenser, resulting in a high-pressure fluid refrigerant in the vicinity of the outlet of the condenser. This is equivalent to that the refrigerant liquefies while radiating heat into the air. Further, the fluid refrigerant whose temperature and pressure are reduced by the throttle 253 flows into the evaporator. When the indoor air is blown into the evaporator under this state, the fluid refrigerant takes a great amount of heat from the air and evaporates, resulting in a low-temperature and low-pressure gas refrigerant. The air which has lost a great amount of heat in the evaporator is discharged as cool air from the blowoff port of the air conditioner.

Then, in the air conditioner 250, a command rpm of the brushless motor is set on the basis of the operation state of the air conditioner, i.e., the target temperature set on the air conditioner and the actual indoor and outdoor temperatures, and the motor driving apparatus 250*b* controls the rpm of the brushless motor of the compressor 250*a* on the basis of the set command rpm, as in the first embodiment.

Next, the operation will be described.

When a driving voltage is supplied from the motor drive control unit 250*b* to the compressor 250*a*, the refrigerant circulates in the refrigerant circulation path, and heat exchange is carried out in the heat exchanger 251 of the indoor unit 255 and the heat exchanger 252 of the outdoor unit 256. That is, in the air conditioner 250, a well-known heat pump cycle is formed in the refrigerant circulation path by circulating the refrigerant sealed in the circulation path, using the compressor 250*a*. Thereby heating or cooling for a room is carried out.

For example, when the air conditioner 250 performs heating, the four-way valve 254 is set by user operation so that the refrigerant flows in the direction of arrow A. In this case, the indoor heat exchanger 251 operates as a condenser, and discharges heat by circulation of the refrigerant in the refrigerant circulation path. Thereby, the room is heated.

Conversely, when the air conditioner 250 performs cooling, the four-way valve 254 is set by user operation so that the refrigerant flows in the direction of arrow B. In this case, the indoor heat exchanger 251 operates as an evaporator, and absorbs heat from the ambient air by circulation of the refrigerant in the refrigerant circulation path. Thereby the room is cooled.

In the air conditioner 250, the command rpm is determined on the basis of the target temperature set on the air conditioner, and the actual room temperature and outdoor temperature, and the motor driving apparatus 250*b* controls the rpm of the brushless motor of the compressor 250*a* on the basis of the command rpm as in the first embodiment. Thereby, comfortable cooling or heating is carried out by the air conditioner 250.

As described above, in the air conditioner 250 according to the seventh embodiment, the brushless motor is employed as a power source of the compressor 250*a*, and the advance angle $\beta$ of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the air conditioner 250 equipped with the brushless motor and the driving apparatus thereof can be provided at a low cost and with a high degree of freedom in design.

Embodiment 8

Figure 13:
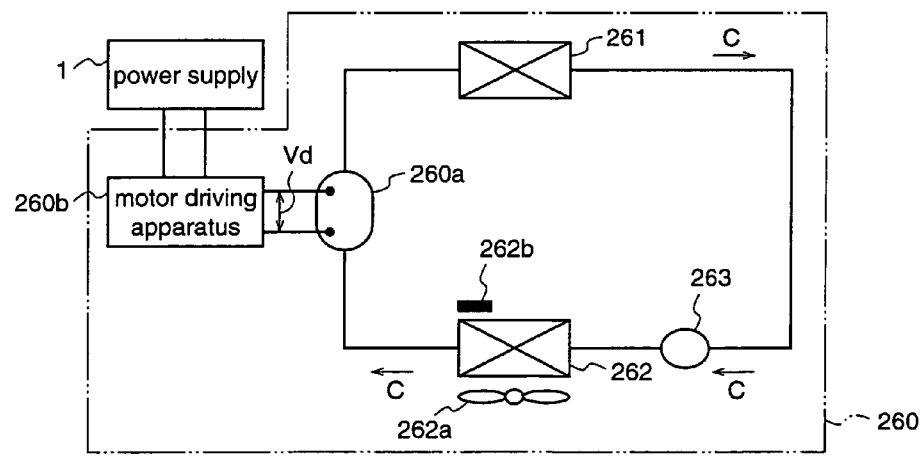
FIG. 13 is a schematic diagram for explaining a refrigerator according to an eighth embodiment of the present invention.

FIG. 13 is a block diagram for explaining a refrigerator according to an eighth embodiment of the present invention.

A refrigerator 260 according to this eighth embodiment comprises a compressor 260*a*, a motor driving apparatus 260*b*, a condenser 261, an evaporator 262, and a throttle 263.

The compressor 260*a*, the condenser 261, the throttle 263, and the evaporator 262 form a refrigerant circulation path, and the motor driving apparatus 260*b* has an input connected to the power supply 1, and drives a brushless motor as a drive source of the compressor 260*a*. The power supply 1, the brushless motor of the compressor 260*a*, and the motor driving apparatus 260*b* are identical to the power supply 1, the brushless motor 2, and the motor driving apparatus 100*a* according to the first embodiment, respectively.

The throttle 263 reduces the flow rate of the fluid refrigerant outputted from the condenser 261 to expand the fluid refrigerant under the state where the refrigerant is circulating in the refrigerant circulation path, and supplies a proper amount of refrigerant that is required for the evaporator 262.

The condenser 261 condenses the high-temperature and high-pressure refrigerant gas flowing therein, and discharges the heat of the refrigerant to the outside air. The refrigerant gas sent into the condenser 261 gradually liquefies while losing heat to the outside air, resulting in a high-pressure fluid refrigerant in the vicinity of the outlet of the condenser.

The evaporator 262 evaporates the low-temperature fluid refrigerant to cool the inside of the refrigerator. The evaporator 262 has an air blower 262a for increasing efficiency of heat exchange, and a temperature sensor 262b for detecting the temperature inside the refrigerator.

Then, in the refrigerator 260, a command rpm is set on the basis of the operation state of the refrigerator, i.e., the target temperature set on the refrigerator and the temperature inside the refrigerator, and the motor driving apparatus 260b controls the rpm of the brushless motor of the compressor 260a on the basis of the set command rpm, as in the first embodiment.

Next, the operation will be described.

In the refrigerator 260, when a driving voltage Vd is supplied from the motor driving apparatus 260b to the brushless motor of the compressor 260a, the compressor 260a is driven and the refrigerant circulates in the direction of arrow C in the refrigerant circulation path, whereby heat exchange is carried out between the condenser 261 and the evaporator 262. Thereby, the inside of the refrigerator is cooled.

That is, the flow rate of the refrigerant, which is liquefied in the condenser 261, is reduced by the throttle 263, and thereby the refrigerant expands, resulting in a low-temperature fluid refrigerant. When the low-temperature fluid refrigerant is sent into the evaporator 262, it is evaporated in the evaporator 262, whereby the inside of the refrigerator is cooled. At this time, the air in the refrigerator is compulsory sent into the evaporator 262 by the air blower 262a, and thereby heat exchange is efficiently carried out in the evaporator 262.

Further, in the refrigerator 260, the command rpm is set according to the target temperature set on the refrigerator 260, and the temperature in the refrigerator, and the motor driving apparatus 260b controls the rpm of the brushless motor of the compressor 260a on the basis of the set command rpm, as in the first embodiment. Thereby, in the refrigerator 260, the temperature in the refrigerator is maintained at the target temperature.

As described above, in the refrigerator 260 according to the eighth embodiment, the brushless motor is employed as a power source of the compressor 260a, and the advance angle β of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the refrigerator 260 equipped with the brushless motor and the driving apparatus thereof can be provided at a low cost and with a high degree of freedom in design.

Embodiment 9

Figure 14:
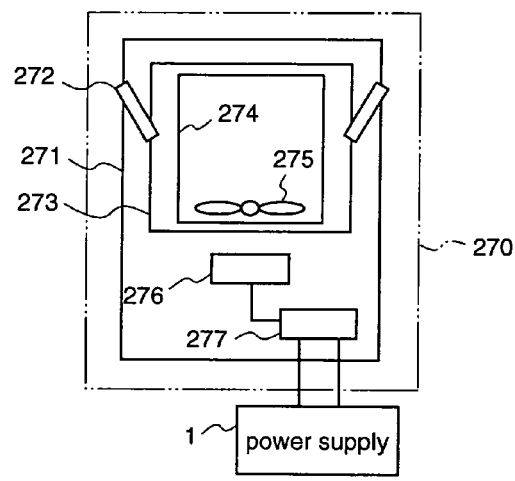
FIG. 14 is a schematic diagram for explaining an electric washing machine according to a ninth embodiment of the present invention.

FIG. 14 is a block diagram for explaining an electric washing machine according to a ninth embodiment of the present invention.

A washing machine 270 according to the ninth embodiment has a washing machine outer frame 271, and an outer bath 273 is hung by a bar 272 in the outer frame 271. A washing/dewatering bath 274 is rotatably placed in the outer frame 273, and an agitation blade 275 is rotatably attached to the bottom of the washing/dewatering bath 274.

A brushless motor 276 for rotating the washing/dewatering bath 274 and the agitation blade 275 are placed in a space beneath the outer bath 273 in the outer frame 271, and a motor driving apparatus 277 that is connected to an external power supply 1 and drives the brushless motor 276 is attached to the outer frame 271.

The power supply 1, the brushless motor 276, and the motor driving apparatus 277 are identical to the power supply 1, the brushless motor 2, and the motor driving apparatus 100a according to the first embodiment, respectively. A command signal indicating a command rpm according to user operation is input to the motor driving apparatus 277 from a microcomputer (not shown) that controls the operation of the washing machine 270.

Next, the operation will be described.

In the washing machine 270, when the user performs a predetermined operation, a command signal is output from the microcomputer to the motor driving apparatus 277, and a driving voltage is supplied from the motor driving apparatus 277 to the brushless motor 276. Then, the agitation blade 275 or the washing/dewatering bath 274 is rotated by the brushless motor 276, and washing or dewatering of laundry such as clothes in the bath 274 is carried out.

At this time, the rpm of the brushless motor 276 is controlled by the motor driving apparatus 277 on the basis of the command rpm indicated by the command signal from the microcomputer, as in the first embodiment. Thereby, the washing machine 270 is operated according to the amount or stains of laundry.

As described above, in the washing machine 270 according to the ninth embodiment, the brushless motor 276 is employed as a power source, and the advance angle β of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the washing machine 270 equipped with the brushless motor and the driving apparatus thereof can be provided at a low cost and with a high degree of freedom in design.

Embodiment 10

Figure 15:
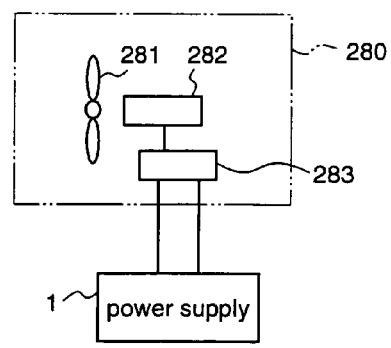
FIG. 15 is a schematic diagram for explaining an air blower according to a tenth embodiment of the present invention.

FIG. 15 is a block diagram for explaining an air blower according to a tenth embodiment of the present invention.

An air blower 280 according to the tenth embodiment is provided with a fan 281, a brushless motor 282 for rotating the fan 281, and a motor driving apparatus 283 that is connected to a power supply 1 and drives the brushless motor 282.

The power supply 1, the brushless motor 282, and the motor driving apparatus 283 are identical to the power supply 1, brushless the motor 2, and the motor driving apparatus 100a according to the first embodiment, respectively, and a command signal indicating a command rpm according to user operation is input to the motor driving apparatus 283 from a microcomputer that controls the operation of the air blower 280.

Next, the operation will be described.

In the air blower 280, when the user performs a predetermined operation, a command signal is output from the microcomputer to the motor driving apparatus 283, and a driving voltage is supplied from the motor driving apparatus 283 to the motor 282. Then, the fan 281 is rotated by the brushless motor 282, and air blowing is carried out.

At this time, the output of the brushless motor 282 is controlled by the motor driving apparatus 283 on the basis of the command signal from the microcomputer, as in the first embodiment. Thereby, the amount or strength of wind is controlled.

As described above, in the air blower 280 according to the tenth embodiment, the brushless motor 282 is employed as a power source, and the advance angle β of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the air blower 280 equipped with the brushless motor and the driving apparatus thereof can be provided at a low cost and with a high degree of freedom in design.

Embodiment 11

Figure 16:
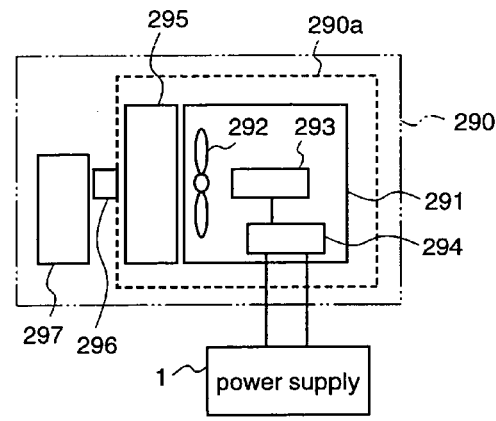
FIG. 16 is a schematic diagram for explaining an electric vacuum cleaner according to an eleventh embodiment of the present invention.

FIG. 16 is a block diagram for explaining an electric vacuum cleaner according to an eleventh embodiment of the present invention.

A vacuum cleaner 290 according to the eleventh embodiment is provided with a floor suction head 297 having an inlet at its bottom, a vacuum cleaner body 290a for sucking air, and a dust suction hose 296 having an end connected to the floor suction head 297 and the other end connected to the cleaner body 290a.

The cleaner body 290a comprises a dust collection chamber 295 having a front surface at which the other end of the dust suction hose 296 is opened, and an electric air blower 291 placed at the rear surface of the dust collecting chamber 295.

The electric air blower 291 comprises a fan 292 placed opposite to the rear surface of the dust collection chamber 295, a brushless motor 293 for rotating the fan, and a motor driving apparatus 294 that is connected to a power supply 1 and drives the brushless motor 293. The air blower 291 performs air blowing so that suction of air is carried out by rotation of the fan 292.

The power supply 1, the brushless motor 293, and the motor driving apparatus 294 are identical to the power supply 1, the brushless motor 2, and the motor driving apparatus 100a according to the first embodiment, respectively, and a command signal indicating a command rpm according to user operation is input to the motor driving apparatus 294 from a microcomputer that controls the operation of the air blower 290.

Next, the operation will be described.

In the vacuum cleaner 290, when the user performs a predetermined operation, a command signal is output from the microcomputer to the motor driving apparatus 294, and a driving voltage is supplied from the motor driving apparatus 294 to the brushless motor 293. Then, the fan 292 is rotated by the brushless motor 293, and a suction force is generated in the cleaner body 290a. The suction force generated in the cleaner body 290a acts on the inlet (not shown) at the bottom of the floor suction head 297 through the hose 296, and dust on the floor is sucked from the inlet of the floor suction head 297 to be collected into the dust collection chamber of the cleaner body 290a.

At this time, in the vacuum cleaner 290, the rpm of the brushless motor 293 is controlled by the motor driving apparatus 294 on the basis of the command signal from the microcomputer, as in the first embodiment. Thereby, the strength of the suction force is controlled.

As described above, in the vacuum cleaner 290 according to the eleventh embodiment, the brushless motor 293 is employed as a power source, and the advance angle β of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the vacuum cleaner 290 equipped with the brushless motor and the driving apparatus thereof can be provided at a low cost and with a high degree of freedom in design.

Embodiment 12

Figure 17:
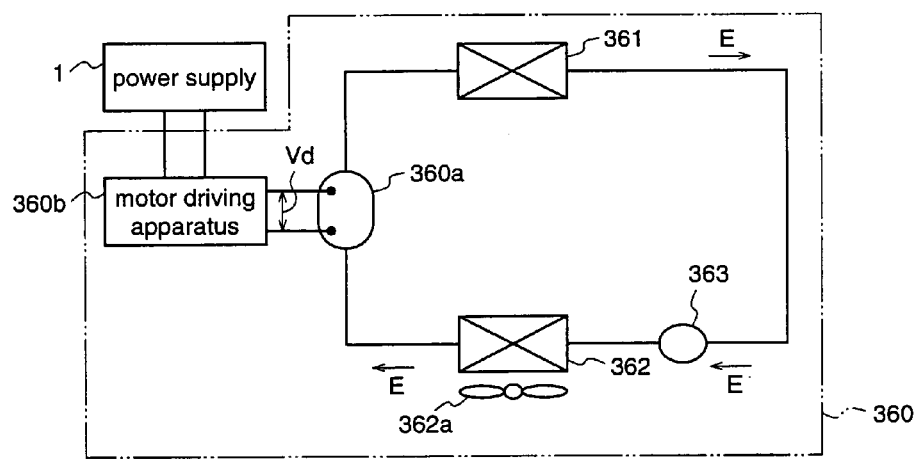
FIG. 17 is a schematic diagram for explaining an electric dryer according to a twelfth embodiment of the present invention.

FIG. 17 is a block diagram for explaining an electric dryer according to a twelfth embodiment of the present invention.

An electric dryer 360 according to the twelfth embodiment comprises a compressor 360a, a motor driving apparatus 360b, a condenser 361, an evaporator 362, and a throttle 363.

The compressor 360a, the condenser 361, the throttle 363, and the evaporator 362 form a refrigerant circulation path. The motor driving apparatus 360b has an input connected to a power supply 1, and drives the brushless motor as a driving source for the compressor 360a. The power supply 1, the brushless motor of the compressor 360a, and the motor driving apparatus 360b are identical to the power supply 1, the brushless motor 2, and the motor driving apparatus 100a according to the first embodiment, respectively.

The throttle 363 reduces the flow rate of the fluid refrigerant outputted from the condenser 361 to expand the fluid refrigerant under the state where the refrigerant is circulating in the refrigerant circulation path, and supplies a proper amount of refrigerant that is required for the evaporator 362.

The condenser 361 condenses the high-temperature and high-pressure refrigerant gas that flows therein, and discharges the heat of the refrigerant to the outside air. The refrigerant gas sent into the condenser 361 gradually liquefies while losing heat to the outside air, resulting in a high-pressure fluid refrigerant in the vicinity of the outlet of the condenser.

The evaporator 362 evaporates the low-temperature fluid refrigerant to dehumidify the inside of the dryer. The evaporator 362 has an air blower 362a for increasing efficiency of dehumidification.

In the dryer 362, the motor driving apparatus 360b controls the output of the motor of the compressor 360a on the basis of the operating state of the dryer, i.e., the degree of dehumidification set on the dryer, and the humidity in the dryer.

Next, the operation will be described.

In the electric dryer 360 according to the twelfth embodiment, when a driving voltage Vd is applied to the brushless motor of the compressor 360a from the motor driving apparatus 360b, the compressor 360a is driven and the refrigerant is circulated in the direction of arrow E in the refrigerant circulation path, whereby heat exchange is carried out in the condenser 361 and in the evaporator 362. Thereby, dehumidification is carried out in the dryer.

That is, in the dryer 360, the flow rate of the refrigerant, which is liquefied in the condenser 361, is reduced by the throttle 363, and thereby the refrigerant expands, resulting in a low-temperature fluid refrigerant. When the low-temperature fluid refrigerant is sent into the evaporator 362, it is evaporated in the evaporator 362, whereby the inside of the dryer is dehumidified. To be specific, the moist air in the dryer is cooled down to its dew-point humidity or lower, and the air from which moisture is removed as condensed water is heated again. At this time, the air in the dryer is compulsory sent into the evaporator by the air blower, and thereby heat exchange is efficiently carried out in the evaporator.

As described above, in the electric dryer 360 according to the twelfth embodiment, the brushless motor is employed as a power source of the compressor 360a, and the advance angle β of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the electric dryer 360 equipped with the brushless motor and the driving apparatus thereof can be provided at a low cost and with a high degree of freedom in design.

Embodiment 13

Figure 18:
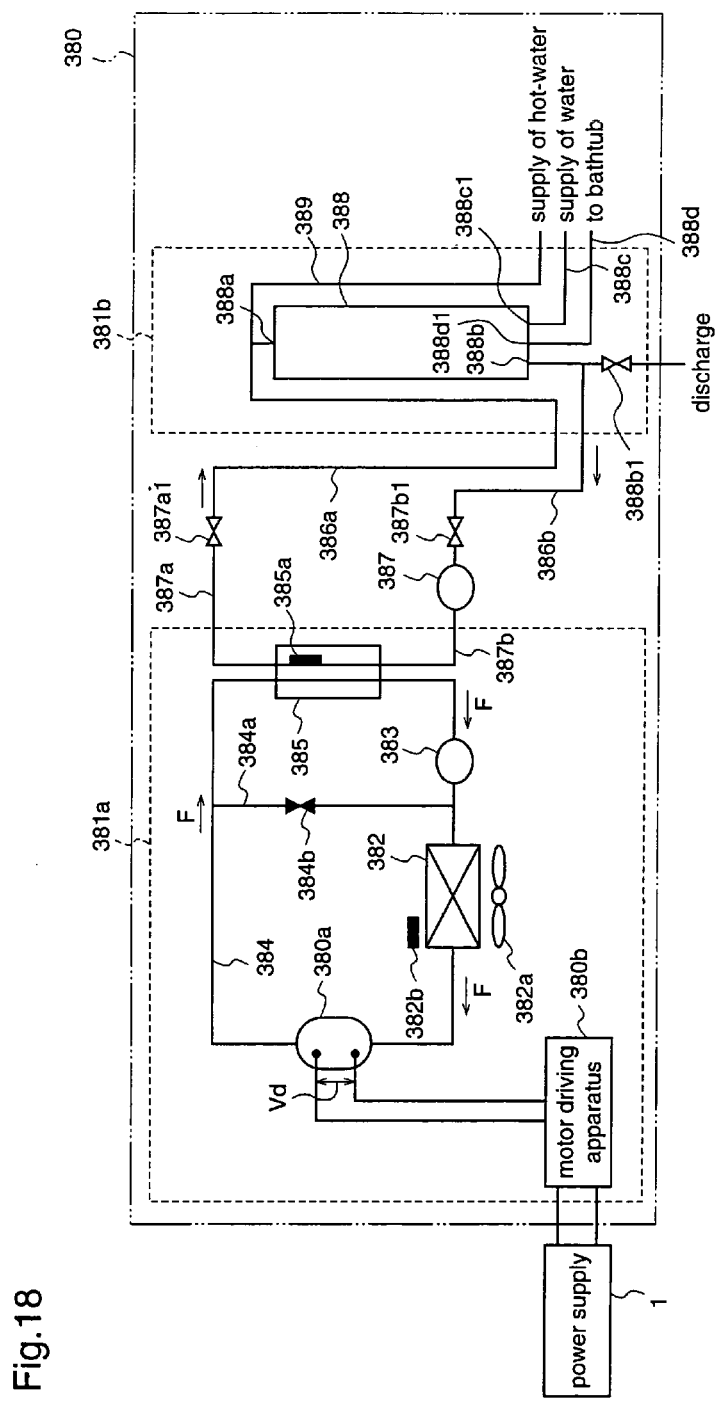
FIG. 18 is a schematic diagram for explaining a heat pump type hot-water supply unit according to a thirteenth embodiment of the present invention.

FIG. 18 is a block diagram for explaining a heat pump type hot-water supply unit according to a thirteenth embodiment of the present invention.

A heat pump type hot-water supply unit 380 according to the thirteenth embodiment includes a refrigeration cycle unit 381a for heating supplied water to discharge hot water, a hot-water storage 381b in which the hot water discharged from the refrigeration cycle unit 381a is stored, and pipes 386a, 386b, 387a, and 387b connecting the refrigeration cycle unit 381a and the hot-water storage 381b.

The refrigeration cycle unit 381a includes a compressor 380a, an air-refrigerant heat exchanger 382, a throttle 383, and a water-refrigerant heat exchanger 385, which constitute a refrigerant circulation path, and a motor driving apparatus 380b that has an input connected to a power supply 1, and drives the motor of the compressor 380a.

The power supply 1, the motor of the compressor 380a, and the motor driving apparatus 380b are identical to the power supply 1, the brushless motor 2, and the motor driving apparatus 10a according to the first embodiment, respectively.

The throttle 383 reduces the flow rate of the fluid refrigerant that is sent from the water-refrigerant heat exchanger 385 to the air-refrigerant heat exchanger 382 to expand the fluid refrigerant, like the throttle 253 of the air conditioner 250 of the ninth embodiment.

The water-refrigerant heat exchanger 385 is a condenser that heats up the water supplied to the refrigeration cycle unit 381a, and has a temperature sensor 385a for detecting the temperature of the heated water. The air-refrigerant heat exchanger 382 is an evaporator that absorbs heat from the ambient atmosphere, and has an air blower 382a for increasing the efficiency of heat exchange, and a temperature sensor 382b for detecting the ambient temperature.

In FIG. 18, reference numeral 384 denotes a refrigerant pipe for circulating the refrigerant along the refrigerant circulation path that is formed by the compressor 380a, the water-refrigerant heat exchanger 385, the throttle 383, and the air-refrigerant heat exchanger 382. The refrigerant pipe 284 is connected to a defrost bypass pipe 384a for supplying the refrigerant discharged from the linear compressor 380a to the air-refrigerant heat exchanger 382, bypassing the water-refrigerant heat exchanger 385 and the throttle 383, and a defrost bypass valve 384b is provided in a portion of the bypass pipe 384a.

The hot-water storage 381b has a hot-water storage tank 388 for keeping water or hot water. A water supply pipe 388c for supplying water from the outside to the storage tank 388 is connected to a water intake port 388c1 of the storage tank 388, and a hot-water supply pipe 388d for supplying hot-water from the storage tank 388 to a bathtub is connected to a hot-water discharge port 388d1 of the storage tank 388. Further, a hot-water supply pipe 389 for supplying the hot water stored in the storage tank 388 to the outside is connected to a water intake/discharge port 388a of the storage tank 388.

The storage tank 388 and the water-refrigerant heat exchanger 385 of the refrigeration cycle unit 381a are connected through pipes 386a, 386b, 387a, and 387b, and a water circulation path is formed between the storage tank 388 and the water-refrigerant heat exchanger 385.

The water supply pipe 386b is a pipe for supplying water from the storage tank 388 to the water-refrigerant heat exchanger 385, and an end of this pipe is connected to a water discharge port 388b of the storage tank 388 while the other end is connected to a water intake side pipe 387b of the water-refrigerant heat exchanger 385 through a joint 387b1. Further, a discharge valve 388b1 for discharging the water or hot water stored in the storage tank 388 is fixed to an end of the water supply pipe 386b. The water supply pipe 386a is a pipe for returning the water from the water-refrigerant heat exchanger 385 to the storage tank 388, and an end of this pipe is connected to the water intake/discharge port 388a of the storage tank 388 while the other end is connected to a discharge side pipe 387a of the water-refrigerant heat exchanger 385 through a joint 387a1.

A pump 387 for circulating the water in the water circulation path is provided in a portion of the water intake side pipe 387b of the water-refrigerant heat exchanger 385.

Further, in the hot-water supply unit 380, a command rpm of the brushless motor is determined on the basis of the operating state of the hot-water supply unit, that is, the target temperature of hot water which is set on the supply unit, the temperature of the water that is supplied from the hot-water storage 381b to the water-refrigerant heat exchanger 385a of refrigeration cycle unit 381a, and the outdoor temperature. The motor driving apparatus 380b determines a motor output required for the brushless motor of the compressor 380a on the basis of the command rpm.

Next, the operation will be described.

When a driving voltage Vd is supplied from the motor drive control unit 380b to the brushless motor of the compressor 380a to drive the compressor 380a, the high-temperature refrigerant compressed by the compressor 380a circulates in the direction of arrow F, that is, the refrigerant passes through the refrigerant pipe 384 and supplied to the water-refrigerant heat exchanger 385. Further, when the pump 387 in the water circulation path is driven, water is supplied from the storage tank 388 to the water-refrigerant heat exchanger 385.

In the water-refrigerant heat exchanger 385, heat exchange is carried out between the refrigerant and the water that is supplied from the storage tank 388, whereby heat moves from the refrigerant to the water. That is, the supplied water is heated, and the heated water (hot water) is supplied to the storage tank 388. At this time, the temperature of the heated water is observed by the condensation temperature sensor 385a.

Further, in the water-refrigerant heat exchanger 385, the refrigerant is condensed by the above-mentioned heat exchange, and the flow rate of the condensed fluid refrigerant is reduced by the throttle 383 to expand the refrigerant, and the refrigerant is sent to the air-refrigerant heat exchanger 382. In the hot-water supply unit 380, the air-refrigerant heat exchanger 382 serves as an evaporator. That is, the air-refrigerant heat exchanger 382 absorbs heat from the outside air that is sent by the air blower 382*b* to evaporate the low-temperature fluid refrigerant. At this time, the temperature of the ambient atmosphere of the air-refrigerant heat exchanger 382 is observed by the temperature sensor 382*b*.

Further, in the refrigeration cycle unit 381*a*, when the air-refrigerant heat exchanger 382 is frosted, the defrost bypass valve 384*b* is opened, and the high-temperature refrigerant is supplied to the air-refrigerant heat exchanger 382 through the defrost bypass line 384*a*. Thereby, the air-refrigerant heat exchanger 382 is defrosted.

On the other hand, the hot water is supplied from the water-refrigerant heat exchanger 385 of the refrigeration cycle unit 381*a* to the hot-water storage 381*b* through the pipes 387*a* and 386*a*, and the supplied hot water is stored in the storage tank 388. The hot water in the storage tank 388 is supplied to the outside through the hot-water supply pipe 389 as required. Especially when the hot water is supplied to a bathtub, the hot water in the storage tank 388 is supplied to the bathtub through a hot-water supply pipe 388*d* for the bathtub.

Further, when the amount of water or hot water stored in the storage tank 388 becomes lower than a predetermined amount, water is supplied from the outside through the water supply pipe 388*c*.

In the hot-water supply unit 380, the motor driving apparatus 380*b* determines a command rpm of the brushless motor, on the basis of the target temperature of the hot water, which is set on the hot-water supply unit 380, the temperature of the water supplied to the water-refrigerant heat exchanger 385, and the outside temperature, and the motor driving apparatus 380*b* controls the rpm of the brushless motor of the compressor 380*a* on the basis of the command rpm. Thereby, hot water of the target temperature is supplied by the hot-water supply unit 380.

As described above, in the heat pump type hot-water supply unit 380 according to the thirteenth embodiment, the brushless motor is employed as a power source of the compressor 380*a*, and the advance angle β of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the heat pump type hot-water supply unit 380 equipped with the brushless motor and the driving apparatus thereof can be provided at a low cost and with a high degree of freedom in design.

Embodiment 14

Figure 19:
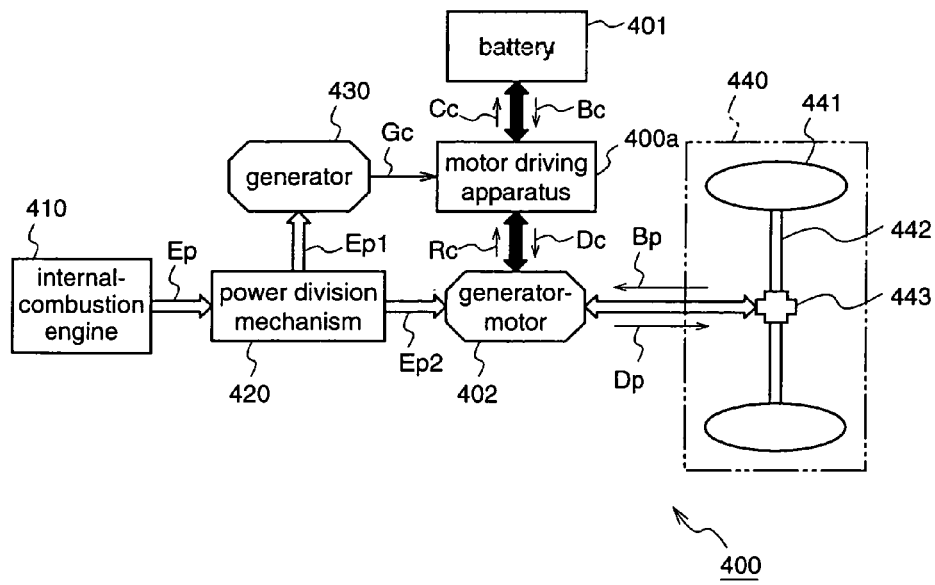
FIG. 19 is a schematic diagram for explaining a hybrid car according to a fourteenth embodiment of the present invention.

FIG. 19 is a schematic diagram for explaining a hybrid car according to a fourteenth aspect of the present invention.

A hybrid car 400 according to the fourteenth aspect is a motor vehicle obtained by combining two power sources, an internal combustion engine and a motor, and it is driven by activating the power sources simultaneously or individually according to the circumstances.

To be specific, the hybrid car 400 includes an internal combustion engine 410 for generating a power Ep; a generator-motor 402 for generating a power according to an inputted voltage, and generating an electrical power according to a power supplied from the outside; and a driving mechanism 440 for generating a driving power for the car by the power generated in the internal combustion engine 410 or the generator-motor 402. Further, the hybrid car 400 includes a battery 401; a generator 430; a power division mechanism 420 for dividing the power Ep generated in the internal combustion engine 410 into two lines of powers Ep1 and Ep2, and supplying the power Ep1 to the generator 430 and the power Ep2 to the generator-motor 402; and a motor driving apparatus 400*a* for receiving an output Bc of the battery 401 and an output Gc of the generator 403, and driving the generator-motor 402.

The generator-motor 402 has the same construction as the brushless motor 2 according to the first embodiment, and operates as a motor or a generator according to the driving condition of the car. To be specific, the generator-motor 402 is rotary-driven by the power Ep2 from the motor division mechanism 420 or a braking force Bp from the driving mechanism 440, and generates a driving force according to a driving current Dc from the motor driving apparatus 400*a*. Further, the driving mechanism 440 includes a pair of driving loops 441; a driving shaft 442 connected to the driving loops 441; and a gear mechanism 443 for transmitting the power Dp supplied from the generator-motor 402 through the driving shaft 442 to the driving loops 441 as a driving force, and transmitting the braking force Bp from the driving loops 441 through the driving shaft 442 to the generator-motor 402 as a driving force. Further, the motor driving apparatus 400*a* has the same circuit construction as that of the motor driving apparatus 100*a* according to the first embodiment. In this fourteenth embodiment, an output terminal of the battery 401 and an output terminal of the generator 403 are connected to the input nodes 1*a* and 1*b* of the motor driving apparatus 400*a*, respectively.

Next, the operation will be described.

In the hybrid car 400, the battery 401 is charged with a power that is generated by rotating the generator 430 with the internal-combustion engine 410, and the output of the battery 401 or the output of the generator 430 is utilized as a driving energy.

For example, during low-speed driving where the driving efficiency by the internal-combustion engine 410 is low, the output Bc of the battery 401 is supplied to the generator-motor 402 by the motor driving apparatus 400*a*, and the driving force Dp generated in the generator-motor 402 is transmitted to the driving loops 441. Thereby, the hybrid car 400 is driven by the motor.

Further, when the driving speed exceeds a predetermined value, the internal-combustion engine 410 starts to operate, and the power Ep generated in the internal-combustion engine 410 is supplied to the generator-motor 402 through the power division mechanism 420 as the power Ep2. Further, in the generator-motor 402, a power is generated by the driving current Dc from the motor driving apparatus 400*a*, and the power Ep2 supplied from the internal-combustion engine 410 and the power generated by the driving current are supplied to the driving mechanism 440 as a driving power Dp. Thereby, in the driving mechanism 440, the driving power Dp is transmitted to the driving loops 441 through the gear mechanism 443 and the driving shaft 442.

Furthermore, in the hybrid car 400, when the driving load on the driving loops 441 is reduced, the power division mechanism 420 distributes part of the power Ep generated in the internal-combustion engine 410 to the generator 430 as the power Ep1 of the power generation system. Then, a power Gc generated in the generator 430 is supplied through the motor driving apparatus 400a to the battery 401 as a charging power Cc, whereby charging of the battery 401 is started. In this state, the hybrid car 400 drives while charging the battery 401.

Furthermore, in the hybrid car 400, when braking is carried out for deceleration or stopping, the braking force Bp of the driving loops 441 is transmitted through the driving shaft 442 and the gear mechanism 443 to the generator-motor 402 as a driving force. At this time, the generator-motor 402 operates as a generator, and a regenerative power Rc generated by the braking force Bp is applied to the battery 401 through the motor driving apparatus 400a, whereby charging of the battery 401 is started.

As described above, in the hybrid car 400 according to the fourteenth embodiment, the brushless motor 402 is employed as a power source, and the advance angle β of the current supplied to the brushless motor is determined so that the deviation between the command rpm fo and the actual rpm f becomes minimum as in the first embodiment. Therefore, it is possible to drive the brushless motor with stability until reaching high-speed rotation, by performing simple and stable weak field control in which only the advance angle of the current should be varied, even in the state where the input voltage of the inverter varies. Thereby, the hybrid car 400 equipped with the brushless motor and the driving apparatus thereof can be provided at a low cost and with a high degree of freedom in design.

In this fourteenth embodiment, the most popular series-parallel hybrid car is described as an example of an electric car. However, a series hybrid car 500 shown in FIG. 20 and a parallel hybrid car 600 shown in FIG. 21 are also within the scope of the present invention.

Figure 20:
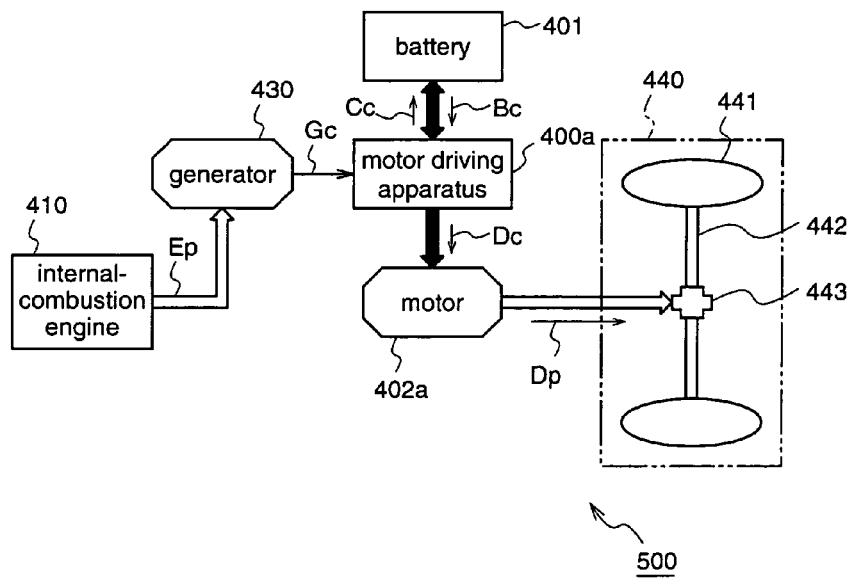
FIG. 20 is a schematic diagram for explaining a modification of the hybrid car according to the fourteenth embodiment, and illustrating a motor system of a series hybrid car.

For example, a series hybrid car 500 shown in FIG. 20 is provided with a motor 402a instead of the generator-motor 402 of the hybrid car 400 shown in FIG. 19, drives the generator 430 with the power Ep from the internal-combustion engine 410, and charges the battery 401 or drives the motor 402a with the generated power Gc. Accordingly, the hybrid car 500 does not have the power division mechanism 420, in contrast to the hybrid car 400 shown in FIG. 19. That is, the hybrid car 400a does not drive the driving loops 411 directly by the internal-combustion engine, but drives the loops 411 by the motor alone. The hybrid car 500 is called as a series hybrid car because the two power sources, i.e., the internal-combustion engine and the motor are connected in series.

Figure 21:
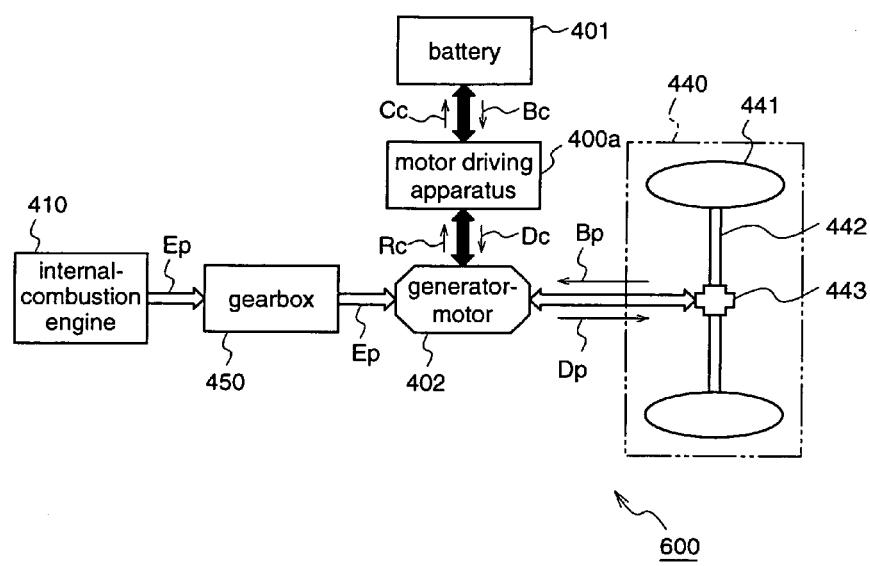
FIG. 21 is a schematic diagram for explaining another modification of a hybrid car according to the fourteenth embodiment, and illustrating a motor system of a parallel hybrid car.

On the other hand, the parallel hybrid car 600 shown in FIG. 21 is provided with a gear box 450 instead of the power division mechanism 420 of the hybrid car 400 shown in FIG. 19, and transmits the power Ep of the internal-combustion engine 410 through the gear box 450 to the generator-motor 402. Accordingly, the hybrid car 600 does not have the generator 430 shown in FIG. 19.

In the parallel hybrid car 600, the internal-combustion engine 410 is mainly used for driving, and there are cases where the internal-combustion engine 410 is used as a power source for charging the battery 401.

For example, during starting or acceleration where the internal-combustion engine 410 is under a load, the generator-motor 402 is operated as a motor by the power Dc supplied from the motor driving apparatus 400a, and the generator-motor 402 outputs the power Ep generated in the internal-combustion engine 410 and the power generated in the generator-motor 402 to the driving mechanism as a driving force Dp. Thereby, driving of the driving loops 441 is assisted by the motor power. Further, when the internal-combustion engine 410 is under a light load where the operation efficiency of the internal-combustion engine 410 is low, the generator-motor 402 operates as a generator, and charging of the battery 401 and driving of the loops 441 are carried out by the power of the internal-combustion engine 410, whereby variations in the load on the internal-combustion engine 410 are reduced. Further, in the hybrid car 600, during braking or downhill driving, the energy utilization efficiency is enhanced by collecting the power by performing regenerative braking, or engine stop while the car is stopped. The hybrid car 600 is called a parallel hybrid car because driving by the internal-combustion engine and driving by the generator-motor are carried out in parallel.

Furthermore, an electric car that has no internal-combustion engine, and is driven by a power from the battery is also within the scope of the present invention. Also in this case, the same effects as described for the fourteenth embodiment can be achieved.

In the seventh to fourteenth embodiments, the motor driving apparatus for driving the brushless motor as a power source is identical to the motor driving apparatus according to the first embodiment. However, the motor driving apparatus according to the seventh to fourteenth embodiments may be identical to any of the motor driving apparatus according to the second to sixth embodiments.

The motor driving apparatus according to the present invention can perform weak-field control for a brushless motor with stability without using predetermined control variables such as table tables, even when an output voltage of a power supply varies steeply or periodically. Therefore, the motor driving apparatus can increase the maximum rpm of the brushless motor.

What is claimed is:

1. A motor driving apparatus for driving a brushless motor, the motor driving apparatus comprising:
   an inverter circuit for converting an output voltage of a power supply into a driving voltage, and outputting the driving voltage to the brushless motor;
   a rotor position estimation unit for estimating a rotor position of the brushless motor; and
   an inverter control unit for controlling said inverter circuit so that the brushless motor is driven by a current based on the estimated rotor position, wherein
   said inverter control unit is operable to control an rpm of the brushless motor by repeatedly conducting an adjustment of a phase difference between the estimated rotor position and the current to be supplied to the brushless motor, based on a change amount in the rpm of the brushless motor obtained by a previous adjustment of the phase difference.

2. A motor driving apparatus as defined in claim 1, wherein said inverter control unit is operable to control the rpm of the brushless motor by increasing/decreasing the phase difference, a state where an amplitude of the current to be supplied to the brushless motor is fixed at a maximum value.

3. A motor driving apparatus as defined in claim 2, wherein the maximum amplitude of the current to be supplied to the brushless motor is a maximum current value that is allowed to be supplied to the brushless motor.

4. A motor driving apparatus as defined in claim 1, wherein said inverter control unit comprises:

a command current waveform generation unit for generating a waveform of a command current based on the estimated rotor position; and a pulse generation unit for generating a pulse signal as a control signal for said inverter circuit so as to decrease a deviation between the waveform of the command current generated by said command current waveform generation unit and a waveform of the current to be supplied to the brushless motor, wherein said inverter control unit is operable to control the rpm of the brushless motor by increasing/decreasing the phase difference, under a state where an amplitude of the waveform of the command current is fixed at a maximum value.

5. A motor driving apparatus as defined in claim 4, wherein the maximum amplitude of the waveform of the command current is a maximum current value that is allowed to be supplied to the brushless motor.

6. A motor driving apparatus as defined in claim 1, wherein said inverter control unit comprises:

a current amplitude determination unit for determining an amplitude of the current to be supplied to the brushless motor;

a command current waveform generation unit for generating a waveform of a command current based on the current amplitude determined by said current amplitude determination unit; and a pulse generation unit for generating a pulse signal as a control signal for said inverter circuit so as to decrease a deviation between the waveform of the command current generated by said command current waveform generation unit and a waveform of the current be supplied to the brushless motor, wherein said inverter control unit is operable to obtain a phase difference that maximizes the rpm of the brushless motor, by changing the phase difference between the estimated rotor position and the current to be supplied to the brushless motor, under a state where an amplitude of the command current is constant.

7. A motor driving apparatus as defined in claim 1, wherein said inverter control unit comprises:

an rpm determination unit for determining the rpm of the brushless motor;

a current amplitude determination unit for determining an amplitude of the current to be supplied to the brushless motor so as to decrease a deviation between the rpm determined by the rpm determination unit and an actual rpm;

a command current waveform generation unit for generating a waveform of a command current based on the current amplitude; and a pulse generation unit for generating a pulse signal as a control signal for said inverter circuit so that a deviation between the waveform of the command current generated by said command current waveform generation unit and a waveform of the current to be supplied to the brushless motor becomes zero, wherein said inverter control unit is operable to obtain a phase difference that minimizes an amplitude of the command current, by changing the phase difference between the estimated rotor position and the current to be supplied to the brushless motor, under a state where a command rpm of the brushless motor is constant.

8. A motor driving apparatus as defined in claim 1, wherein said inverter circuit includes a capacitor adapted to be charged by a regenerative current from the brushless motor.

9. A motor driving apparatus as defined in claim 1, wherein said inverter circuit includes an inductor that is connected between the inverter circuit and the power supply, the inductor for cutting off noise generated in said inverter circuit.

10. A compressor comprising a brushless motor for generating power, and a motor driving apparatus for driving the brushless motor, said motor driving apparatus being a motor driving apparatus as defined in claim 1.

11. An air conditioner comprising a compressor having a brushless motor for generating power, and a motor driving apparatus for driving the brushless motor of the compressor, said motor driving apparatus being a motor driving apparatus as defined in claim 1.

12. A refrigerator comprising a compressor having a brushless motor for generating power, and a motor driving apparatus for driving the brushless motor of the compressor, said motor driving apparatus being a motor driving apparatus as defined in claim 1.

13. An electric washing machine comprising a brushless motor for generating power, and a motor driving apparatus for driving the brushless motor, said motor driving apparatus being a motor driving apparatus as defined in claim 1.

14. An air blower comprising a brushless motor for generating power, and a motor driving apparatus for driving the brushless motor, said motor driving apparatus being a motor driving apparatus as defined in claim 1.

15. An electric vacuum cleaner comprising a brushless motor for generating power, and a motor driving apparatus for driving the brushless motor, said motor driving apparatus being a motor driving apparatus as defined in claim 1.

16. An electric dryer comprising a compressor having a brushless motor for generating power, and a motor driving apparatus for driving the brushless motor of the compressor, said motor driving apparatus being a motor driving apparatus as defined in claim 1.

17. A heat pump type hot-water supply unit comprising a compressor having a brushless motor for generating power, and a motor driving apparatus for driving the brushless motor of the compressor, said motor driving apparatus being a motor driving apparatus as defined in claim 1.

* * * * *

UNITED STATES PATENT AND TRADEMARK OFFICE
CERTIFICATE OF CORRECTION

PATENT NO. : 7,176,644 B2
APPLICATION NO. : 10/834988
DATED : February 13, 2007
INVENTOR(S) : Mitsuo Ueda et al.

Page 1 of 1

It is certified that error appears in the above-identified patent and that said Letters Patent is hereby corrected as shown below:

In column 36, claim 2, line 59, please change "difference, a state" to --difference, under a state--.

In column 37, claim 6, line 32, please change "current be" to --current to be--.

Signed and Sealed this

Thirteenth Day of November, 2007

JON W. DUDAS
*Director of the United States Patent and Trademark Office*